(12) United States Patent
Lim et al.

(10) Patent No.: US 12,736,775 B2
(45) Date of Patent: Sep. 15, 2026

(54) IMAGING LENS SYSTEM

(71) Applicants: Samsung Electro-Mechanics Co., Ltd., Suwon-si (KR); Kumoh National Institute of Technology Industry-Academic Cooperation Foundation, Gumi-si (KR)

(72) Inventors: Tae Yeon Lim, Suwon-si (KR); Yong Joo Jo, Suwon-si (KR); Phil Ho Jung, Suwon-si (KR); Jae Myung Ryu, Gumi-si (KR)

(73) Assignees: Samsung Electro-Mechanics Co., Ltd., Suwon-si (KR); Kumoh National Institute of Technology Industry-Academic Cooperation Foundation, Gumi-si (KR)

( * ) Notice: Subject to any disclaimer, the term of this patent is extended or adjusted under 35 U.S.C. 154(b) by 443 days.

(21) Appl. No.: 18/127,326

(22) Filed: Mar. 28, 2023

(65) Prior Publication Data

US 2023/0408793 A1 Dec. 21, 2023

(30) Foreign Application Priority Data

Jun. 17, 2022 (KR) ........................ 10-2022-0074104

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01); *G02B 13/009* (2013.01)

(58) Field of Classification Search
CPC ..... G02B 9/62; G02B 13/0045; G02B 13/009
See application file for complete search history.

(56) References Cited

U.S. PATENT DOCUMENTS 5,537,255 A 7/1996 Tochigi
9,170,405 B2 10/2015 Kawamura
(Continued)

FOREIGN PATENT DOCUMENTS

CN 104011576 A 8/2014
CN 109725403 A 5/2019
(Continued)

OTHER PUBLICATIONS

CN112444946, translation (Year: 2021).*
(Continued)

*Primary Examiner* — Wen Huang
(74) *Attorney, Agent, or Firm* — NSIP Law

(57) ABSTRACT

An imaging lens system includes a first lens having a negative refractive power, a second lens having a refractive power, a third lens having a refractive power, a fourth lens having a refractive power, a fifth lens having a refractive power, and a sixth lens having a convex object-side surface is convex in a paraxial region thereof and a concave image-side surface in a paraxial region thereof. The first to sixth lenses are sequentially disposed in ascending numerical order along an optical axis of the imaging lens system from an object side of the imaging lens system toward an image plane of the imaging lens system, and one or more of the first to fifth lenses is configured to be movable in a direction of the optical axis.

12 Claims, 16 Drawing Sheets

(56) References Cited

U.S. PATENT DOCUMENTS

| | | | | |
|---|---|---|---|---|
| 2008/0117529 | A1 | 5/2008 | Jeong | |
| 2014/0307337 | A1 | 10/2014 | Kawamura | |
| 2017/0192203 | A1 | 7/2017 | Chang | |
| 2017/0199360 | A1 | 7/2017 | Chang | |
| 2019/0129148 | A1 | 5/2019 | Son et al. | |
| 2019/0361201 | A1 | 11/2019 | Chang et al. | |
| 2021/0215917 | A1 | 7/2021 | Liu et al. | |
| 2021/0263266 | A1 | 8/2021 | Chen et al. | |
| 2022/0043190 | A1 | 2/2022 | Kwon | |
| 2022/0066138 | A1* | 3/2022 | Lian | G02B 13/18 |
| 2023/0121630 | A1* | 4/2023 | Fu | G02B 13/06<br>359/713 |

FOREIGN PATENT DOCUMENTS

| | | | |
|---|---|---|---|
| CN | 112444946 | A | 3/2021 |
| CN | 112782837 | A | 5/2021 |
| JP | H7-151967 | A | 6/1995 |
| JP | 2005-164653 | A | 6/2005 |
| JP | 5592571 | B2 | 9/2014 |
| JP | 2021-33180 | A | 3/2021 |
| KR | 10-2008-0046328 | A | 5/2008 |
| KR | 10-2010-0060308 | A | 6/2010 |
| TW | 201723578 | A | 7/2017 |
| TW | 201918740 | A | 5/2019 |
| TW | 202004247 | A | 1/2020 |
| TW | 202041910 | A | 11/2020 |
| TW | M612634 | U | 6/2021 |

OTHER PUBLICATIONS

JP2005164653, translation (Year: 2005).*

Korean Office Action issued on Aug. 9, 2024, in counterpart Korean Patent Application No. 10-2022-0074104 (12 pages in English, 9 pages in Korean).

Taiwanese Office Action issued on Mar. 11, 2024, in counterpart Taiwanese Patent Application No. 112106785 (6 pages in English, 5 pages in Chinese).

Taiwanese Office Action issued on Oct. 15, 2024, in counterpart Taiwanese Patent Application No. 112106785 (10 pages in English, 9 pages in Chinese).

Taiwanese Office Action issued on Sep. 8, 2025, in counterpart Taiwanese Patent Application No. 114130950 (7 pages in English, 6 pages in Chinese).

Chinese Office Action issued on Mar. 23, 2026, in counterpart Chinese Patent Application No. 202310493317.2 (4 pages in English, 5 pages in Chinese).

Taiwanese Office Action Issued on Apr. 21, 2026, in counterpart Taiwanese Patent Application No. 114130950 (7 pages in English, 7 pages in Chinese).

* cited by examiner

IMAGING LENS SYSTEM

CROSS-REFERENCE TO RELATED APPLICATIONS

This application claims the benefit under 35 USC 119(a) of Korean Patent Application No. 10-2022-0074104 filed on Jun. 17, 2022, in the Korean Intellectual Property Office, the entire disclosure of which is incorporated herein by reference for all purposes.

BACKGROUND

1. Field

The following description relates to an imaging lens system capable of adjusting a focal magnification.

2. Description of Related Art

A portable electronic device may include a camera module for taking pictures or taking videos. For example, the camera module may be mounted on a mobile phone, a notebook computer, a game machine, or other portable electronic device. Portable electronic devices are generally manufactured to be thin or small in order to increase user portability. Therefore, the camera module mounted on the portable electronic device is configured to have a limited type of imaging lens system. For example, the camera module includes an imaging lens system having a single focal length. However, it may be difficult for an imaging lens system having a single focal length to exhibit high optical properties.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens having a negative refractive power; a second lens having a refractive power; a third lens having a refractive power; a fourth lens having a refractive power; a fifth lens having a refractive power; and a sixth lens having a convex object-side surface in a paraxial region thereof and a concave image-side surface in a paraxial region thereof, wherein the first to sixth lenses are sequentially disposed in ascending numerical order along an optical axis of the imaging lens system from an object side of the imaging lens system toward an image plane of the imaging lens system, and one or more of the first to fifth lenses is configured to be movable in an optical axis direction of the imaging lens system.

The imaging lens system may further include an optical path changing element disposed on an object side of the first lens.

The second lens may have a positive refractive power.

The sixth lens may have a positive refractive power.

The third lens may have a concave object-side surface in a paraxial region thereof.

The third lens may have a concave image-side surface in a paraxial region thereof.

The fifth lens may have a concave object-side surface in a paraxial region thereof.

The fifth lens may have a concave image-side surface in a paraxial region thereof.

A conditional expression $3.0<(R12+R11)/(R12-R11)<7.0$ may be satisfied, where R11 is a radius of curvature of the object-side surface of the sixth lens at the optical axis, and R12 is a radius of curvature of the image-side surface of the sixth lens at the optical axis.

A conditional expression $-0.2<(R6+R5)/(R6-R5)<0.8$ may be satisfied, where R5 is a radius of curvature of an object-side surface of the third lens at the optical axis, and R6 is a radius of curvature of an image-side surface of the third lens at the optical axis.

The one or more of the first to fifth lenses may be configured to be movable in the optical axis direction to vary a focal length of the imaging lens system, and $1.0<f6/fF<1.3$ may be satisfied, where fF is a maximum focal length of the imaging lens system, and f6 is a focal length of the sixth lens.

The first and second lenses may constitute a first lens group, the third and fourth lenses may constitute a second lens group, the fifth lens may constitute a third lens group, the sixth lens may constitute a fourth lens group, the first lens group may be disposed at a fixed position, the fourth lens group may be disposed at a fixed position, the second lens group may be configured to be movable toward the image plane in the optical axis direction and the third lens group may be configured to be movable toward the object side of the imaging lens system in the optical axis direction to increase a focal length of the imaging lens system, and the second lens group may be further configured to be movable toward the object side of the imaging lens system in the optical axis direction and the third lens group may be further configured to be movable toward the image plane in the optical axis direction to decrease the focal length of the imaging lens system.

The first to fourth lenses may constitute a first lens group, the fifth and sixth lenses may constitute a second lens group, the second lens group may be disposed at a fixed position, the first lens group may be configured to be movable toward the image plane in the optical axis direction to increase a focal length of the imaging lens system, and the first lens group is further configured to be movable toward the object side of the imaging lens system in the optical axis direction to decrease the focal length of the imaging lens system.

The first to fourth lenses may constitute a first lens group, the fifth lens may constitute a second lens group, the sixth lens may constitute a third lens group, the first lens group may be disposed at a fixed position, the third lens group may be disposed at a fixed position, the second lens group may be configured to be movable toward the object side of the imaging lens system in the optical axis direction to increase a focal length of the imaging lens system, and the second lens group may be further configured to be movable toward the image plane in the optical axis direction to decrease the focal length of the imaging lens system.

In another general aspect, an imaging lens system includes a first lens group and a second lens group sequentially disposed in ascending numerical order along an optical axis of the imaging lens system from an object side of the imaging lens system toward an image plane of the imaging lens system, wherein the first lens group or the second lens group is configured to be movable in an optical axis direction of the imaging lens system, and $2.5<fG1/Y<3.0$ is satisfied, where fG1 is a focal length of the first lens group, and Y is a maximum image height on the image plane.

The imaging lens system may further include a third lens group disposed on an image side of the second lens group.

The imaging lens may further include a fourth lens group disposed on an image side of the third lens group.

The first lens group or the second lens group may be configured to be movable in the optical axis direction to vary a focal length of the imaging lens system, and $0.8<TTL/fF<1.0$ may be satisfied, where TTL is a distance along the optical axis from an object-side surface of a frontmost lens of the first lens group to the image plane, and fF is a maximum focal length of the imaging lens system.

An f-number of the imaging lens system may be less than 2.60.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
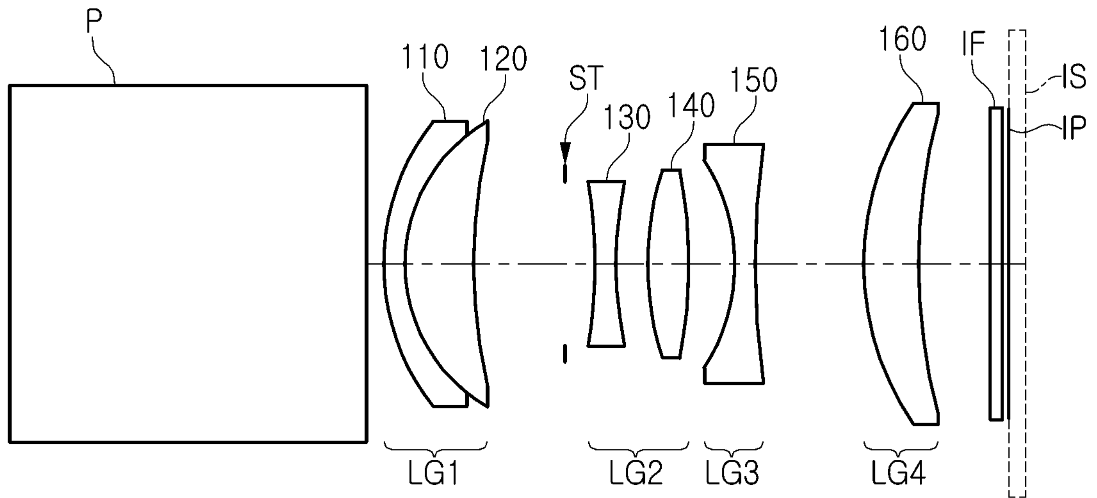
FIG. 1 is a configuration diagram of a far-distance mode of an imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In this specification, a first lens of an imaging lens system is a lens closest to an object (or a subject), and a sixth lens of the imaging lens system is a lens closest to an image plane (or an image sensor).

The unit of radiuses of curvature, thicknesses. distances, TTL (a distance along an optical axis of the imaging lens system from an object-side surface of the first lens to the image plane), BFL (a distance along the optical axis from an image-side surface of the sixth lens to the image plane), Y (a maximum image height on the image plane), and focal lengths is mm.

The thicknesses of the lenses and other elements, the distances between the lenses and other elements, TTL, and BFL are measured along the optical axis of the lenses. Radiuses of curvature of lens surfaces are measured at the optical axis.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations sin θ≈θ, tan θ≈θ, and cos θ≈1 are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as convex, the entire object-side surface of the lens may not be convex, and a peripheral region of the object-side surface of the lens may be concave. Also, even though the image-side surface of the lens may be described as concave, the entire image-side surface of the lens may not be concave, and a peripheral region of the image-side surface of the lens may be convex.

An imaging lens system according to a first aspect of the present disclosure includes six lenses. For example, the imaging lens system may include a first lens, a second lens, a third lens, a fourth lens, a fifth lens, and a sixth lens sequentially disposed in ascending numerical order along an optical axis of the imaging lens system from an object side of the imaging lens system toward an image plane of the imaging lens system. The imaging lens system according to the first aspect may include a lens having a negative refractive power. For example, in the imaging lens system, the first lens may have a negative refractive power. The imaging lens system according to the first aspect may include a lens having a convex object-side surface and a concave image-side surface. For example, in the imaging lens system, the sixth lens may have a convex object-side surface and a concave image-side surface. The imaging lens system according to the first aspect may include one or more lenses configured to move in an optical axis direction. For example, in the imaging lens system, one or more of the first to fifth lenses may be configured to move in the optical axis direction to vary a focal length of the imaging lens system.

The imaging lens system according to the first aspect may further include an optical path changing element. For example, the imaging lens system may further include a prism disposed on the object side of the first lens. However, the position of the prism (i.e., the optical path changing element) in the imaging lens system is not limited to the object side of the first lens.

An imaging lens system according to a second aspect of the present disclosure may include a plurality of lens groups. For example, the imaging lens system according to the second aspect may include a first lens group and a second lens group sequentially disposed in ascending numerical order along an optical axis of the imaging lens system from an object side of the imaging lens system toward an image plane of the imaging lens system. The imaging lens system according to the second aspect may include a lens group configured to be movable in an optical axis direction to vary a focal length of the imaging lens system. For example, in the imaging lens system, the first lens group or the second lens group may be configured to be movable in the optical axis direction. The imaging lens system according to the second aspect may satisfy a specific conditional expression. For example, the imaging lens system according to the second aspect may satisfy the following conditional expression with respect to a focal length fG1 of the first lens group and a maximum image height Y on the image plane.

$$2.5 < fG1/Y < 3.0 \quad \text{(Conditional Expression 1)}$$

The imaging lens system according to the second aspect may further include one or more lens groups in addition to the first lens group and the second lens group. For example, the imaging lens system according to the second aspect may further include a third lens group disposed on the image side of the second lens group. As another example, the imaging lens system according to the second aspect may further include a fourth lens group disposed on the image side of the third lens group.

An imaging lens system according to a third aspect may include first to sixth lenses sequentially disposed in ascending numerical order along an optical axis of the imaging lens system from an object side of the imaging lens system toward an image plane of the imaging lens system, and may satisfy one or more of the following conditional expressions. In addition, the imaging lens system according to the third aspect may further include features of the imaging lens system according to either one or both of the first and the second aspect.

$$1.5 < |d\max/(Y*Mf)| < 4.0 \quad \text{(Conditional Expression 2)}$$

$$3.0 < (R12+R11)/(R12-R11) < 7.0 \quad \text{(Conditional Expression 3)}$$

$$-0.2 < (R6+R5)/(R6-R5) < 0.8 \quad \text{(Conditional Expression 4)}$$

$$0.5 < SR/Y < 0.7 \quad \text{(Conditional Expression 5)}$$

$$1.0 < f6/fF < 1.3 \quad \text{(Conditional Expression 6)}$$

$$-5.0 < (D0*Mf)/Y < -3.0 \quad \text{(Conditional Expression 7)}$$

In the above conditional expressions, dmax is a maximum movement distance among the lens group or groups that are moved in the optical axis direction to vary the focal length of the imaging lens system between a maximum focal length in a far-distance mode and a minimum focal length in a near-distance mode, Mf is a maximum image magnification of the imaging lens system, R5 is the radius of curvature of the object-side surface of the third lens at the optical axis, R6 is a radius of curvature of the image-side surface of the third lens at the optical axis, R11 is the radius of curvature of the object-side surface of the sixth lens at the optical axis, R12 is the radius of curvature of the image-side surface of the sixth lens at the optical axis, SR is an aperture radius of a stop, fF is the focal length of the imaging lens system in a far-distance mode, i.e., the maximum focal length of the imaging lens system, f6 is the focal length of the sixth lens, and DO is a shortest imaging distance of the imaging lens system, i.e., a shortest distance between an object and a first surface of the imaging lens system at which the imaging lens system can focus the object on the image plane. The maximum image magnification Mf is the magnification of the entire imaging lens system at the minimum object distance, and is equal to the length of the image divided by the length of the object. The maximum image magnification Mf is positive if the image is not inverted relative to the object, and is negative if the image is inverted relative to the object.

An imaging lens system according to a fourth aspect may include first to sixth lenses sequentially disposed in ascending numerical order along an optical axis of the imaging lens system from an object side of the imaging lens system toward an image plane of the imaging lens system, and may satisfy one or more of the following conditional expressions. The imaging lens system according to the fourth aspect may further include one or more of the characteristics of the imaging lens systems according to the first to third aspects.

$$f-\text{number} < 2.60 \quad \text{(Conditional Expression 8)}$$

$$6.0 < TTL/BFL < 8.0 \quad \text{(Conditional Expression 9)}$$

$$0.76 < D16/TTL < 0.96 \quad \text{(Conditional Expression 10)}$$

$$0.70 < D16/fF < 0.90 \quad \text{(Conditional Expression 11)}$$

$$0.80 < TTL/fF < 1.0 \quad \text{(Conditional Expression 12)}$$

$$0.80 < |f1/f6| < 1.20 \quad \text{(Conditional Expression 13)}$$

$$-1.0 < f2/f5 < -0.70 \quad \text{(Conditional Expression 14)}$$

$$-1.20 < f3/f4 < -0.80 \quad \text{(Conditional Expression 15)}$$

$$0 < f2/f5 - f3/f4 < 0.2 \quad \text{(Conditional Expression 16)}$$

$$0.80 < (f2-f3)/(f4-f5) < 1.10 \quad \text{(Conditional Expression 17)}$$

$$-1.2 < (f1+f2+f3)/(f4+f5+f6) < -0.9 \quad \text{(Conditional Expression 18)}$$

$$2.0 < |f1/f6 + f2/f5 + f3/f4| < 4.0 \quad \text{(Conditional Expression 19)}$$

$$0.70 < (R1+R11)/(R2+R12) < 1.2 \quad \text{(Conditional Expression 20)}$$

$$1.81 < (Nd1+Nd2+Nd3)/3 < 1.91 \quad \text{(Conditional Expression 21)}$$

$$0.96 < (Nd1+Nd5)/(Nd2+Nd4) < 1.06 \quad \text{(Conditional Expression 22)}$$

In the above conditional expressions, TTL is the distance along the optical axis from the object-side surface of the first lens (or the frontmost lens) to the image plane, BFL is the distance along the optical axis from the image-side surface of the sixth lens (or the rearmost lens) to the image plane, D16 is the distance along the optical axis from the object-side surface of the first lens to the image-side surface of the sixth lens, f1 is the focal length of the first lens, f2 is the focal length of the second lens, f3 is the focal length of the third lens, f4 is the focal length of the fourth lens, f5 is the focal length of the fifth lens, f6 is the focal length of the sixth lens, R1 is the radius of curvature of the object-side surface of the first lens at the optical axis, R2 is the radius of curvature of the image-side surface of the first lens at the optical axis, Nd1 is the refractive index of the first lens, Nd2 is the refractive index of the second lens, Nd3 is the refractive index of the third lens, Nd4 is the refractive index of the fourth lens, and Nd5 is the refractive index of the fifth lens.

The imaging lens system in the present specification may include one or more lenses having the characteristics described below. For example, the imaging lens system according to the first aspect may include one of the first to sixth lenses having the characteristics described below. As another example, the imaging lens systems according to the second to fourth aspects may include one or more of the first to sixth lenses having the characteristics described below. However, the imaging lens systems according to the first to fourth aspects do not necessarily include any of the lenses having the characteristics described below. Hereinafter, characteristics of the first to sixth lenses will be described.

The first lens has a refractive power. For example, the first lens may have a negative refractive power. The first lens may have one convex surface. For example, the first lens may have a convex object-side surface. The first lens includes a spherical surface or an aspherical surface. For example, both surfaces of the first lens may be spherical. As another example, at least one surface of the first lens may be an aspherical surface. The first lens may be made of a material having a relatively high light transmittance and an excellent workability. For example, the first lens may be made of a plastic material or a glass material. The first lens may have a high refractive index. For example, the refractive index of the first lens may be greater than 1.8. As another example, the refractive index of the first lens may be greater than 1.90 and less than 2.0. The first lens may have a predetermined Abbe number. For example, the Abbe number of the first lens may be less than 20. As another example, the Abbe number of the first lens may be greater than 16 and less than 20.

The second lens has a refractive power. For example, the second lens may have a positive refractive power. The second lens may have one convex surface. For example, the second lens may have a convex object-side surface. The second lens includes a spherical surface or an aspherical surface. For example, both surfaces of the second lens may be spherical. As another example, at least one surface of the second lens may be an aspherical surface. The second lens may be made of a material having a high light transmittance and an excellent workability. For example, the second lens may be made of a plastic material or a glass material. The second lens may have a high refractive index. For example, the refractive index of the second lens may be greater than 1.8. As another example, the refractive index of the second lens may be greater than 1.80 and less than 1.90. As another example, the refractive index of the second lens may be lower than the refractive index of the first lens. The second lens may have a predetermined Abbe number. For example, the Abbe number of the second lens may be 30 or more. As another example, the Abbe number of the second lens may be greater than 36 and less than 50.

The third lens has a refractive power. For example, the third lens may have a negative refractive power. The third lens may have at least one concave surface. For example, the third lens may have a concave object-side surface. As another example, the third lens may have a concave image-side surface. The third lens includes a spherical surface or an aspherical surface. For example, both surfaces of the third lens may be spherical. As another example, at least one surface of the third lens may be an aspherical surface. The third lens may be made of a material having a high light transmittance and an excellent workability. For example, the third lens may be made of a plastic material. The third lens may have a lower refractive index than the first lens. For example, the refractive index of the third lens may be greater than 1.6. As another example, the refractive index of the third lens may be greater than 1.6 and less than 1.9. As another example, the refractive index of the third lens may be lower than the refractive index of the second lens. The third lens may have a predetermined Abbe number. For example, the Abbe number of the third lens may be greater than 20. As another example, the Abbe number of the third lens may be greater than 20 and less than 50.

The fourth lens has a refractive power. For example, the fourth lens may have a positive refractive power. The fourth lens may have at least one convex surface. For example, the fourth lens may have a convex object-side surface. As another example, the fourth lens may have a convex image-side surface. The fourth lens includes a spherical surface or an aspherical surface. For example, both surfaces of the fourth lens may be spherical. As another example, at least one surface of the fourth lens may be an aspherical surface. The fourth lens may be made of a material having a high light transmittance and an excellent workability. For example, the fourth lens may be made of a plastic material. The fourth lens may have a refractive index lower than the first lens. For example, the refractive index of the fourth lens may be less than 1.6. As another example, the refractive index of the fourth lens may be greater than 1.5 and less than 1.6. The fourth lens may have a predetermined Abbe number. For example, the Abbe number of the fourth lens may be greater than 50. As another example, the Abbe number of the fourth lens may be greater than 50 and less than 70.

The fifth lens has a refractive power. For example, the fifth lens may have a negative refractive power. The fifth lens may have at least one concave surface. For example, the fifth lens may have a concave object-side surface. As another example, the fifth lens may have a concave image-side surface. The fifth lens includes a spherical surface or an aspherical surface. For example, both surfaces of the fifth lens may be spherical. As another example, at least one surface of the fifth lens may be an aspherical surface. The fifth lens may be made of a material having a high light transmittance and an excellent workability. For example, the fifth lens may be made of a plastic material. The fifth lens may have a refractive index greater than the third lens. For example, the refractive index of the fifth lens may be greater than 1.5. As another example, the refractive index of the fifth lens may be greater than 1.5 and less than 1.6. As another example, the refractive index of the fifth lens may be less than or equal to the refractive index of the fourth lens. The fifth lens may have a predetermined Abbe number. For example, the Abbe number of the fifth lens may be greater than 50. As another example, the Abbe number of the fifth lens may be greater than 50 and less than 70. As another example, the Abbe number of the fifth lens may be greater than or equal to the Abbe number of the fourth lens.

The sixth lens has a refractive power. For example, the sixth lens may have a positive refractive power. The sixth lens has one convex surface. For example, the sixth lens may have a convex object-side surface. The sixth lens includes a spherical surface or an aspherical surface. For example, both surfaces of the sixth lens may be spherical. As another example, at least one surface of the sixth lens may be an aspherical surface. As another example, an inflection point may be formed on the image-side surface of the sixth lens. The sixth lens may be made of a material having high light transmittance and excellent workability. For example, the sixth lens may be made of a plastic material. The sixth lens may be configured to have a predetermined refractive index. For example, the refractive index of the sixth lens may be greater than 1.6. As another example, the refractive index of the sixth lens may be greater than 1.6 and less than 1.7. As another example, the refractive index of the sixth lens may be less than or equal to the refractive index of the third lens. The sixth lens may have a predetermined Abbe number. For example, the Abbe number of the sixth lens may be greater than 20. As another example, the Abbe number of the sixth lens may be greater than 20 and less than 40.

The first to sixth lenses may include a spherical surface or an aspherical surface as described above. When the first to sixth lenses include an aspherical surface, the aspherical surface may be expressed by Equation 1 below.

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c is a curvature of a lens surface and is equal to a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A to H and J are aspheric constants, and Z (also known as sag) is a distance in a direction parallel to the optical axis of the lens surface from the point on the lens surface at the distance r from the optical axis of the lens surface to a tangential plane perpendicular to the optical axis and intersecting a vertex of the lens surface The imaging lens system according to the above-described aspect may further include a stop and a filter. As an example, the imaging lens system may further include a stop disposed between the second lens and the third lens. The stop may be configured to adjust an amount of light incident in the direction of the image plane. The filter may be disposed between the rearmost lens (the sixth lens) and the image plane. The filter may be configured to block light of a specific wavelength range. For example, the filter described herein may be configured to block infrared rays, but light that is blocked by the filter is not limited to infrared rays.

Hereinafter, an imaging lens system according to first to fourth examples will be described with reference to the drawings.

Figure 2:
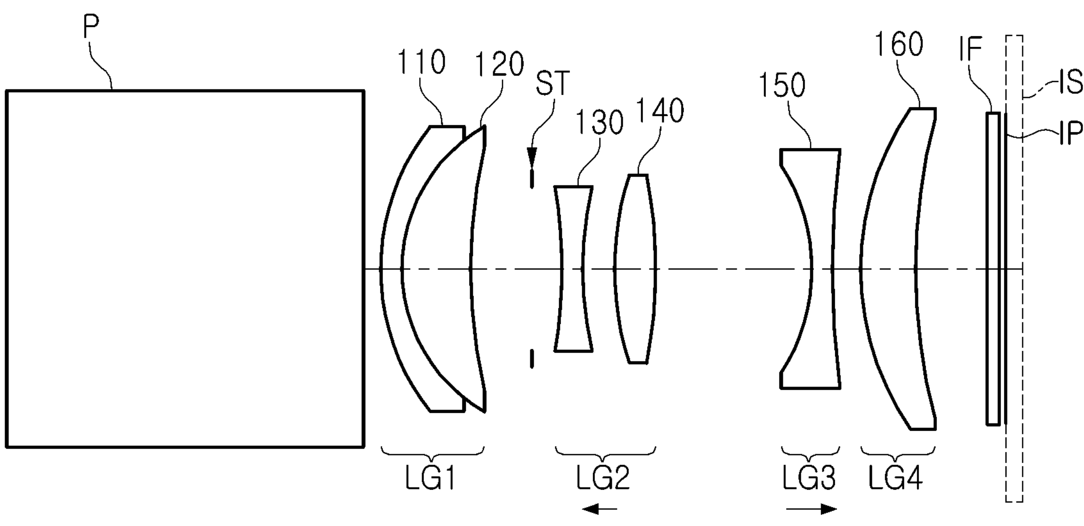
FIG. 2 is a configuration diagram of a near-distance mode of the imaging lens system according to the first example.

FIG. 1 is a configuration diagram of a far-distance mode of an imaging lens system according to a first example, and FIG. 2 is a configuration diagram of a near-distance mode of the imaging lens system according to the first example.

An imaging lens system 100 according to the first example may include a plurality of lens groups. For example, the imaging lens system 100 may include a first lens group LG1, a second lens group LG2, a third lens group LG3, and a fourth lens group LG4. The first lens group LG1 to the fourth lens group LG4 may be sequentially disposed in ascending numerical order along an optical axis of the imaging lens system 100 from an object side of the imaging lens system 100 toward an image plane of the imaging lens system 100. For example, the second lens group LG2 is disposed on the image side of the first lens group LG1, the third lens group LG3 is disposed on the image side of the second lens group LG2, and the fourth lens group LG4 is disposed on the image side of the third lens group LG3. Each of the first lens group LG1 to the fourth lens group LG4 may include one or more lenses. As an example, each of the first lens group LG1 and the second lens group LG2 includes two lenses, and each of the third lens group LG3 and the fourth lens group LG4 includes one lens.

The first lens group LG1 includes a first lens 110 and a second lens 120. The first lens 110 has a negative refractive power, and has a convex object-side surface and a concave image-side surface. The second lens 120 has a positive refractive power, and has a convex object-side surface and a concave image-side surface. The second lens group LG2 includes a third lens 130 and a fourth lens 140. The third lens 130 has a negative refractive power, and has a concave object-side surface and a concave image-side surface. The fourth lens 140 has a positive refractive power, and has a convex object-side surface and a convex image-side surface. The third lens group LG3 includes a fifth lens 150. The fifth lens 150 has a negative refractive power, and has a concave object-side surface and a concave image-side surface. The fourth lens group LG4 includes a sixth lens 160. The sixth lens 160 has a positive refractive power, and has a convex object-side surface and a concave image-side surface.

One or more of the first lens group LG1 to the fourth lens group LG4 may be configured to be movable in the optical axis direction. For example, in the first example, the second lens group LG2 and the third lens group LG3 may be configured to be movable in the optical axis direction. Therefore, the imaging lens system 100 according to the first example may enable autofocusing (AF) and focus magnification adjustment (Zoom) of the camera module through the movements of the second lens group LG2 and the third lens group LG3.

The imaging lens system 100 may further include other optical elements in addition to the first lens 110 to the sixth lens 160. For example, the imaging lens system 100 may further include an optical path changing element P, a stop ST, a filter IF or a cover glass, and an image plane IP. For example, the optical path changing element P may be a prism or a mirror. The optical path changing element P may be configured to reflect or refract light incident from a direction intersecting the optical axis of the first lens 110 to the sixth lens 160, in the optical axis direction of the first lens 110 to the sixth lens 160. The stop ST may be disposed between the second lens 120 and the third lens 130, and the filter IF may be disposed between the sixth lens 160 and the image plane IP. For reference, it may be possible to omit the filter IF and dispose a cover glass in its place. The image plane IP may be disposed at a position where light incident through the first lens 110 to the sixth lens 160 is focused. For example, the image plane IP may be disposed on one surface of an image sensor IS of the camera module or on an optical element disposed inside the image sensor IS.

The imaging lens system 100 according to the first example may implement two or more imaging modes. As an example, the imaging lens system 100 may implement a first imaging mode (or a far-distance mode) using the configuration illustrated in FIG. 1. As another example, the imaging lens system 100 may implement a second imaging mode (or a near-distance mode) using the configuration illustrated in FIG. 2. The change from the first imaging mode to the second imaging mode and the change from the second imaging mode to the first imaging mode may be performed by changing the positions of the second lens group LG2 and the third lens group LG3.

For example, the imaging lens system 100 according to the second imaging mode may be implemented by moving the second lens group LG2 toward the object side and the third lens group LG3 toward the image side in the imaging lens system 100 according to the first imaging mode. As another example, the imaging lens system 100 according to the first imaging mode may be implemented by moving the second lens group LG2 toward the image side and the third lens group LG3 toward the object side in the imaging lens system 100 according to the second imaging mode.

The imaging lens system 100 may also implement a third imaging mode (or an intermediate mode) in which the position of the second lens group LG2 is between the position of the second lens group LG2 in the first imaging mode (or the far-distance mode) and the position of the second lens group LG2 in the second imaging mode (or the near-distance mode), and the position of the third lens group LG3 is between the position of the third lens group LG3 in the first imaging mode (or the far-distance mode) and the position of the third lens group LG3 in the second imaging mode (or the near-distance mode).

Tables 1 and 2 below show the lens characteristics of the imaging lens system according to the first example and the distance between the lens groups.

TABLE 1

| Surface Number | Element | Radius of Curvature | Thickness/ Distance | Refractive Index | Abbe Number |
|---|---|---|---|---|---|
| S0 | Object | Infinity | D0 | | |
| S1 | Prism | Infinity | 6.0000 | 1.834 | 37.34 |
| S2 | | Infinity | 0.2830 | | |
| S3 | First Lens | 3.8830 | 0.3500 | 1.946 | 17.98 |
| S4 | Second | 2.7900 | 1.1600 | 1.883 | 40.80 |
| S5 | Lens | 9.2380 | D1 | | |
| S6 | Stop | Infinity | 0.5000 | | |
| S7 | Third | −9.2010 | 0.3500 | 1.835 | 42.72 |
| S8 | Lens | 7.7800 | 0.5320 | | |
| S9 | Fourth | 4.5390 | 0.6900 | 1.583 | 59.46 |
| S10 | Lens | −8.2244 | D2 | | |
| S11 | Fifth | −3.1110 | 0.3500 | 1.516 | 64.06 |
| S12 | Lens | 21.7826 | D3 | | |
| S13 | Sixth | 4.3864 | 0.9200 | 1.689 | 31.16 |
| S14 | Lens | 7.4817 | 1.2110 | | |
| S15 | Filter | Infinity | 0.2100 | 1.517 | 64.21 |
| S16 | | Infinity | 0.1000 | | |
| S17 | Image Plane | Infinity | 0.0000 | | |

TABLE 2

| Mode | m | D0 | D1 | D2 | D3 |
|---|---|---|---|---|---|
| Far-Distance Mode | 0 | Infinity | 1.547652 | 0.773723 | 1.817320 |

TABLE 2-continued

| Mode | m | D0 | D1 | D2 | D3 |
|---|---|---|---|---|---|
| Intermediate Mode | −0.0822 | 128.6377 | 1.250911 | 1.738619 | 1.149162 |
| Near-Distance Mode | −0.1499 | 66.2756 | 1.038352 | 2.619683 | 0.480711 |

Figure 3:
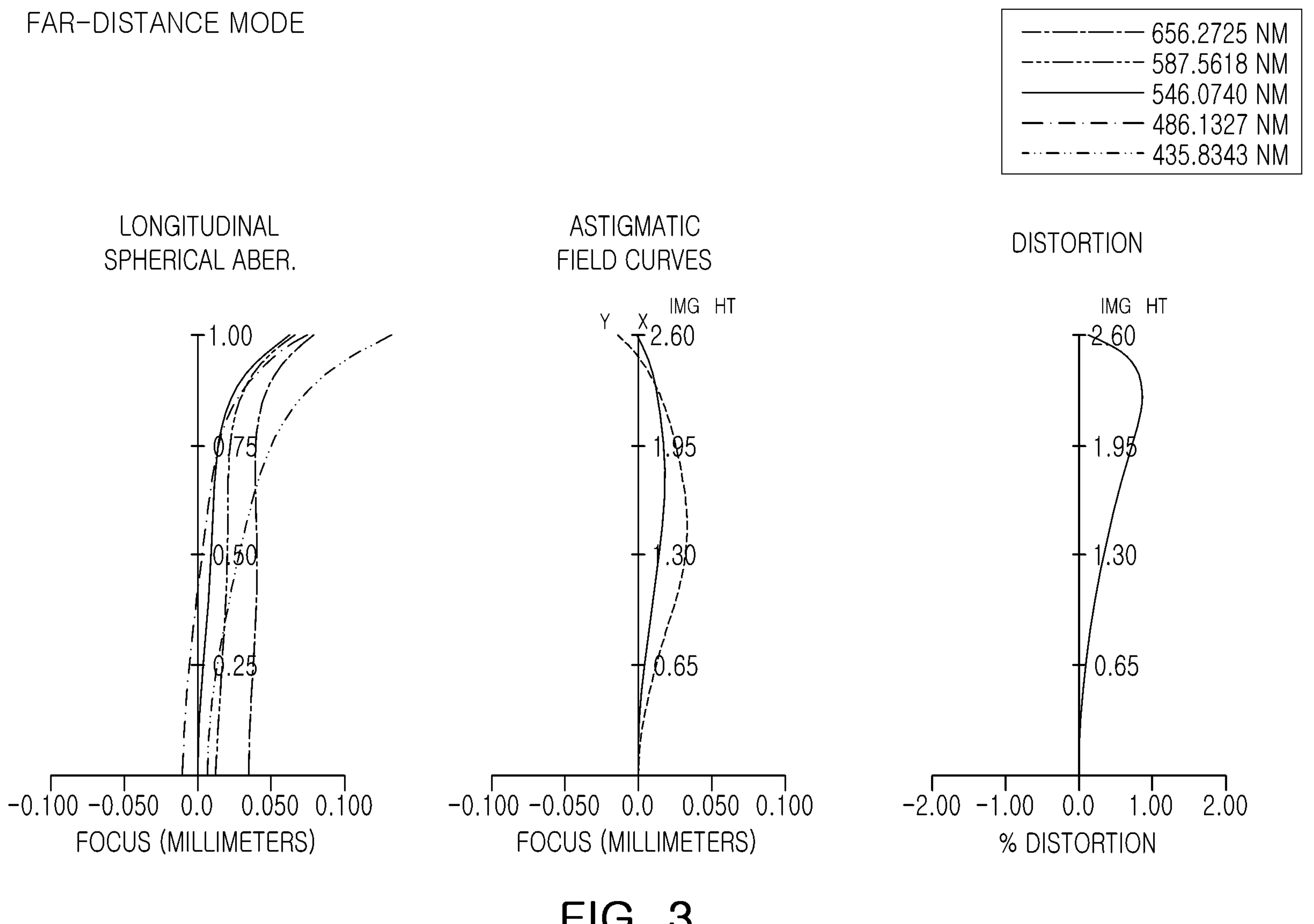
FIG. 3 shows aberration curves of the far-distance mode of the imaging lens system according to the first example illustrated in FIG. 1.
Figure 4:
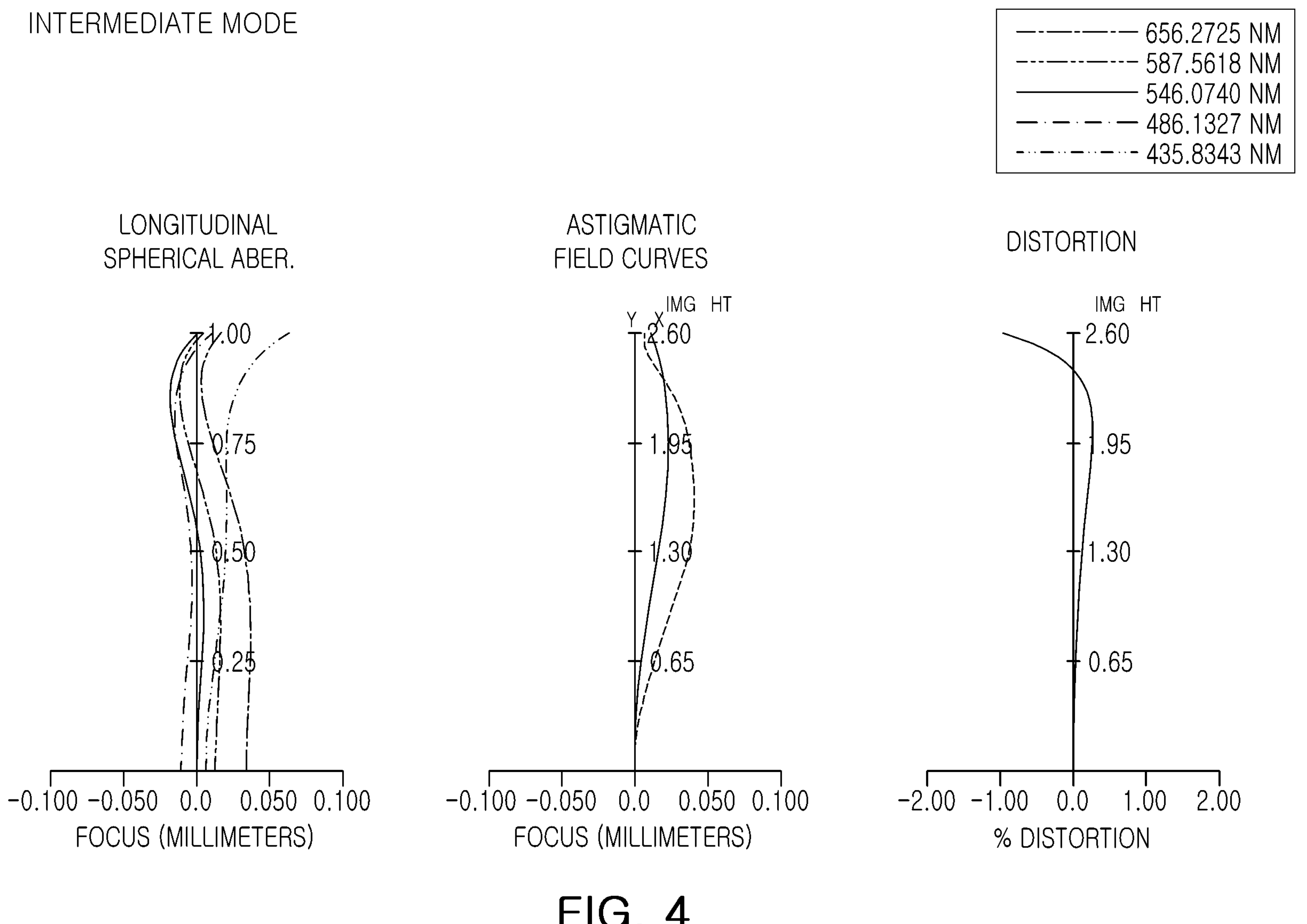
FIG. 4 shows aberration curves of an intermediate mode of the imaging lens system according to the first example.
Figure 5:
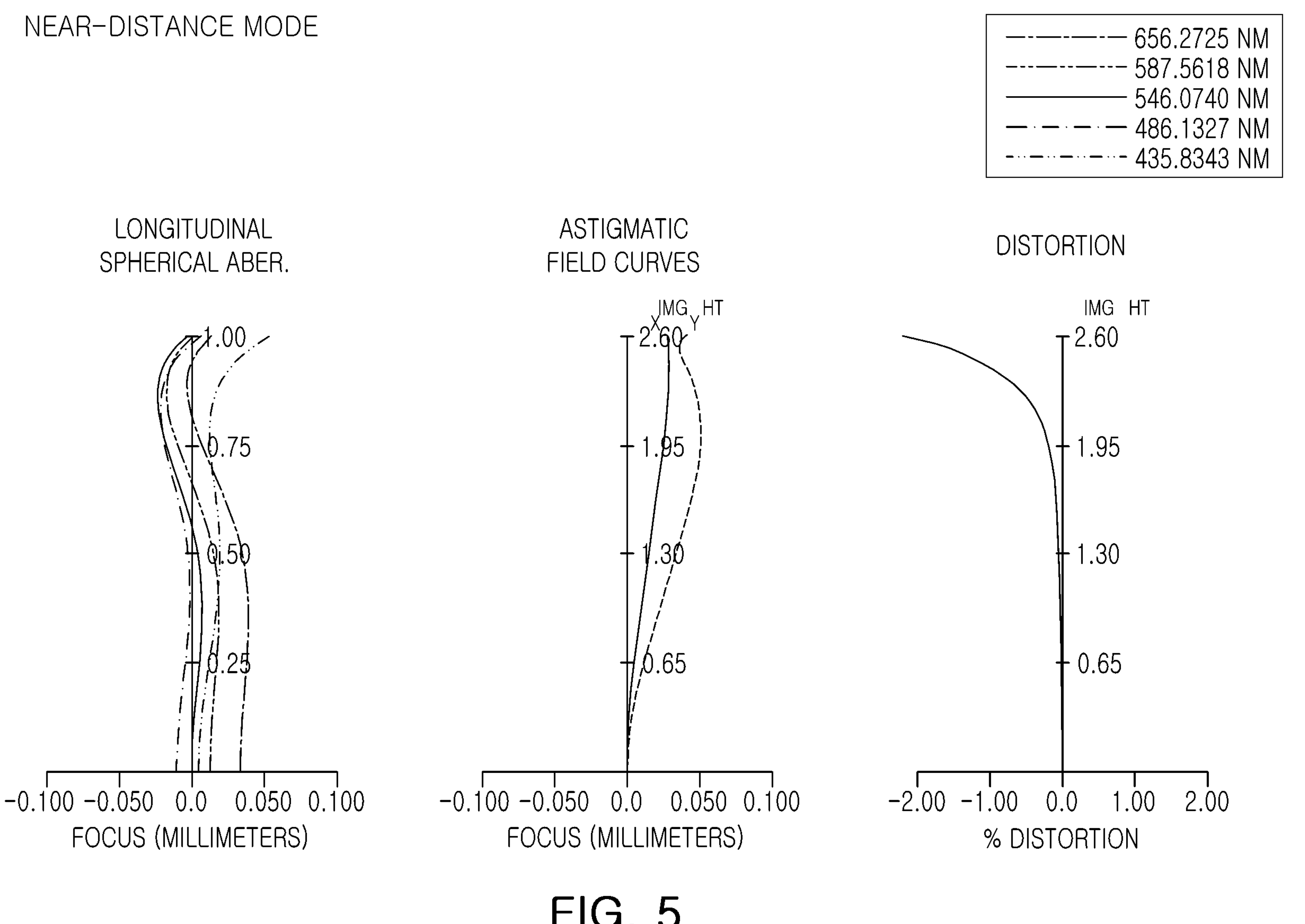
FIG. 5 shows aberration curves of the near-distance mode of the imaging lens system according to the first example illustrated in FIG. 2.

FIG. 3 shows aberration curves of the far-distance mode of the imaging lens system 100 illustrated in FIG. 1. FIG. 4 shows aberration curves of the intermediate mode of the imaging lens system 100. FIG. 5 shows aberration curves of the near-distance mode of the imaging lens system 100 illustrated in FIG. 2.

Figure 6:
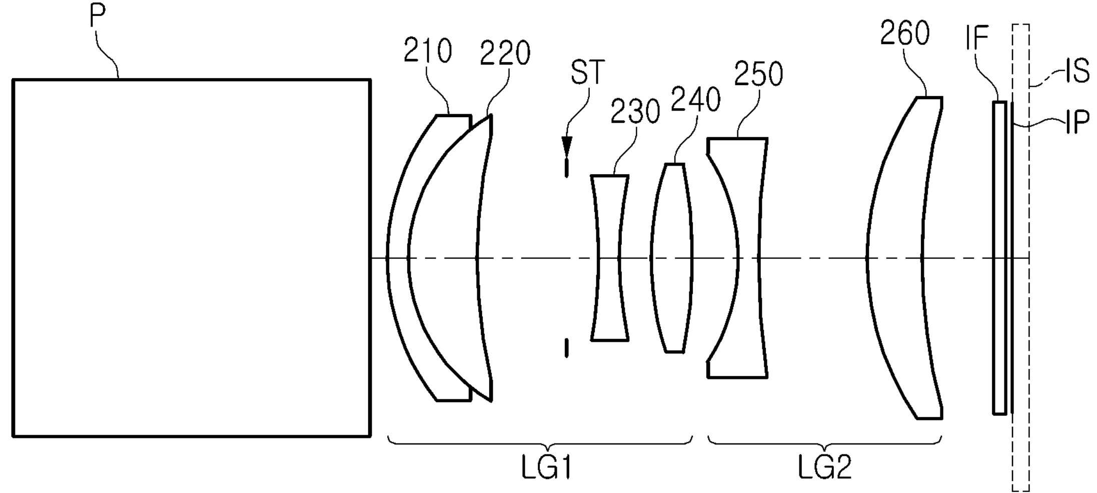
FIG. 6 is a configuration diagram of a far-distance mode of an imaging lens system according to a second example.
Figure 7:
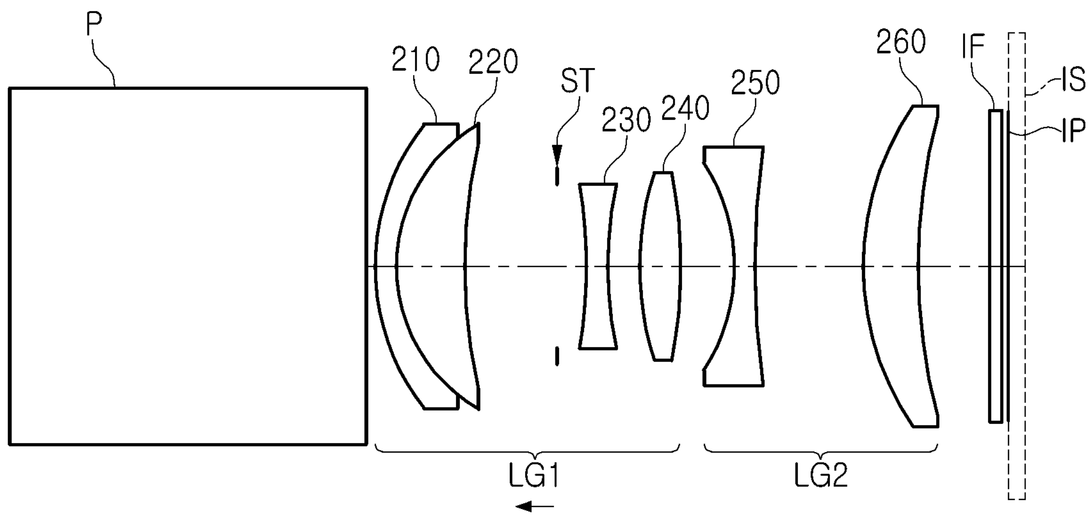
FIG. 7 is a configuration diagram of a near-distance mode of the imaging lens system according to the second example.

FIG. 6 is a configuration diagram of a far-distance mode of an imaging lens system according to a second example, and FIG. 7 is a configuration diagram of a near-distance mode of the imaging lens system according to the second example.

An imaging lens system 200 according to the second example may include a plurality of lens groups. For example, the imaging lens system 200 may include a first lens group LG1 and a second lens group LG2. The first lens group LG1 and the second lens group LG2 may be sequentially disposed in ascending numerical order along an optical axis of the imaging lens system 200 from an object side of the imaging lens system 200 toward an image plane of the imaging lens system 200. For example, the second lens group LG2 is disposed on the image side of the first lens group LG1. Each of the first lens group LG1 and the second lens group LG2 may include one or more lenses. As an example, the first lens group LG1 includes four lenses, and the second lens group LG2 includes two lenses.

The first lens group LG1 includes a first lens 210, a second lens 220, a third lens 230, and a fourth lens 240. The first lens 210 has a negative refractive power, and has a convex object-side surface and a concave image-side surface. The second lens 220 has a positive refractive power, and has a convex object-side surface and a concave image-side surface. The third lens 230 has a negative refractive power, and has a concave object-side surface and a concave image-side surface. The fourth lens 240 has a positive refractive power, and has a convex object-side surface and a convex image-side surface. The second lens group LG2 includes a fifth lens 250 and a sixth lens 260. The fifth lens 250 has a negative refractive power, and has a concave object-side surface and a concave image-side surface. The sixth lens 260 has a positive refractive power, and has a convex object-side surface and a concave image-side surface.

The first lens group LG1 may be configured to be movable in the optical axis direction. Therefore, the imaging lens system 200 according to the second example may enable autofocusing (AF) and focus magnification adjustment (Zoom) of the camera module through movement of the first lens group LG1.

The imaging lens system 200 may further include other optical elements in addition to the first lens 210 to the sixth lens 260. For example, the imaging lens system 200 may further include an optical path changing element P, a stop ST, a filter IF or a cover glass, and an image plane IP. For example, the optical path changing element P may be a prism or a mirror. The optical path changing element P may be configured to reflect or refract light incident from a direction intersecting the optical axis of the first lens 210 to the sixth lens 260, in the optical axis direction of the first lens 210 to the sixth lens 260. The stop ST may be disposed between the second lens 220 and the third lens 230, and the filter IF may be disposed between the sixth lens 260 and the image plane IP. For reference, it may be possible to omit the filter IF and dispose a cover glass in its place. The image plane IP may be disposed at a position where light incident through the first lens 210 to the sixth lens 260 is focused. For example, the image plane IP may be disposed on one surface of an image sensor IS of the camera module or on an optical element disposed inside the image sensor IS.

The imaging lens system 200 according to the second example may implement two or more imaging modes. As an example, the imaging lens system 200 may implement a first imaging mode (or a far-distance mode) using the configuration illustrated in FIG. 6. As another example, the imaging lens system 200 may implement a second imaging mode (or a near-distance mode) using the configuration illustrated in FIG. 7. The change from the first imaging mode to the second imaging mode and the change from the second imaging mode to the first imaging mode may be performed by changing the position of the first lens group LG1.

For example, the imaging lens system 200 according to the second imaging mode may be implemented by moving the first lens group LG1 toward the object side in the imaging lens system 200 according to the first imaging mode. As another example, the imaging lens system 200 according to the first imaging mode may be implemented by moving the first lens group LG1 toward the image side in the imaging lens system 200 according to the second imaging mode.

The imaging lens system 200 may also implement a third imaging mode (or an intermediate mode) in which the position of the first lens group LG1 is between the position of the first lens group LG1 in the first imaging mode (or the far-distance mode) and the position of the first lens group LG1 in the second imaging mode (or the near-distance mode).

Tables 3 and 4 below show the lens characteristics of the imaging lens system according to the second example and the distance between the lens groups.

TABLE 3

| Surface Number | Element | Radius of Curvature | Thickness/ Distance | Refractive Index | Abbe Number |
|---|---|---|---|---|---|
| S0 | Object | Infinity | D0 | | |
| S1 | Prism | Infinity | 6.0000 | 1.834 | 37.34 |
| S2 | | Infinity | D1 | | |
| S3 | First Lens | 3.8830 | 0.3500 | 1.946 | 17.98 |
| S4 | Second | 2.7900 | 1.1600 | 1.883 | 40.80 |
| S5 | Lens | 9.2380 | 1.5477 | | |
| S6 | Stop | Infinity | 0.5000 | | |
| S7 | Third | −9.2010 | 0.3500 | 1.835 | 42.72 |
| S8 | Lens | 7.7800 | 0.5320 | | |
| S9 | Fourth | 4.5390 | 0.6900 | 1.583 | 59.46 |
| S10 | Lens | −8.2244 | D2 | | |
| S11 | Fifth | −3.1110 | 0.3500 | 1.516 | 64.06 |
| S12 | Lens | 21.7826 | 1.8173 | | |
| S13 | Sixth | 4.3864 | 0.9200 | 1.689 | 31.16 |
| S14 | Lens | 7.4817 | 1.2110 | | |
| S15 | Filter | Infinity | 0.2100 | 1.517 | 64.21 |
| S16 | | Infinity | 0.1000 | | |
| S17 | Image Plane | Infinity | 0.0000 | | |

TABLE 4

| Mode | m | D0 | D1 | D2 |
|---|---|---|---|---|
| Far-Distance Mode | 0 | Infinity | 0.283000 | 0.773723 |
| Intermediate Mode | −0.0188 | 600.0000 | 0.191387 | 0.865291 |
| Near-Distance Mode | −0.0282 | 400.0000 | 0.145250 | 0.911406 |

Figure 8:
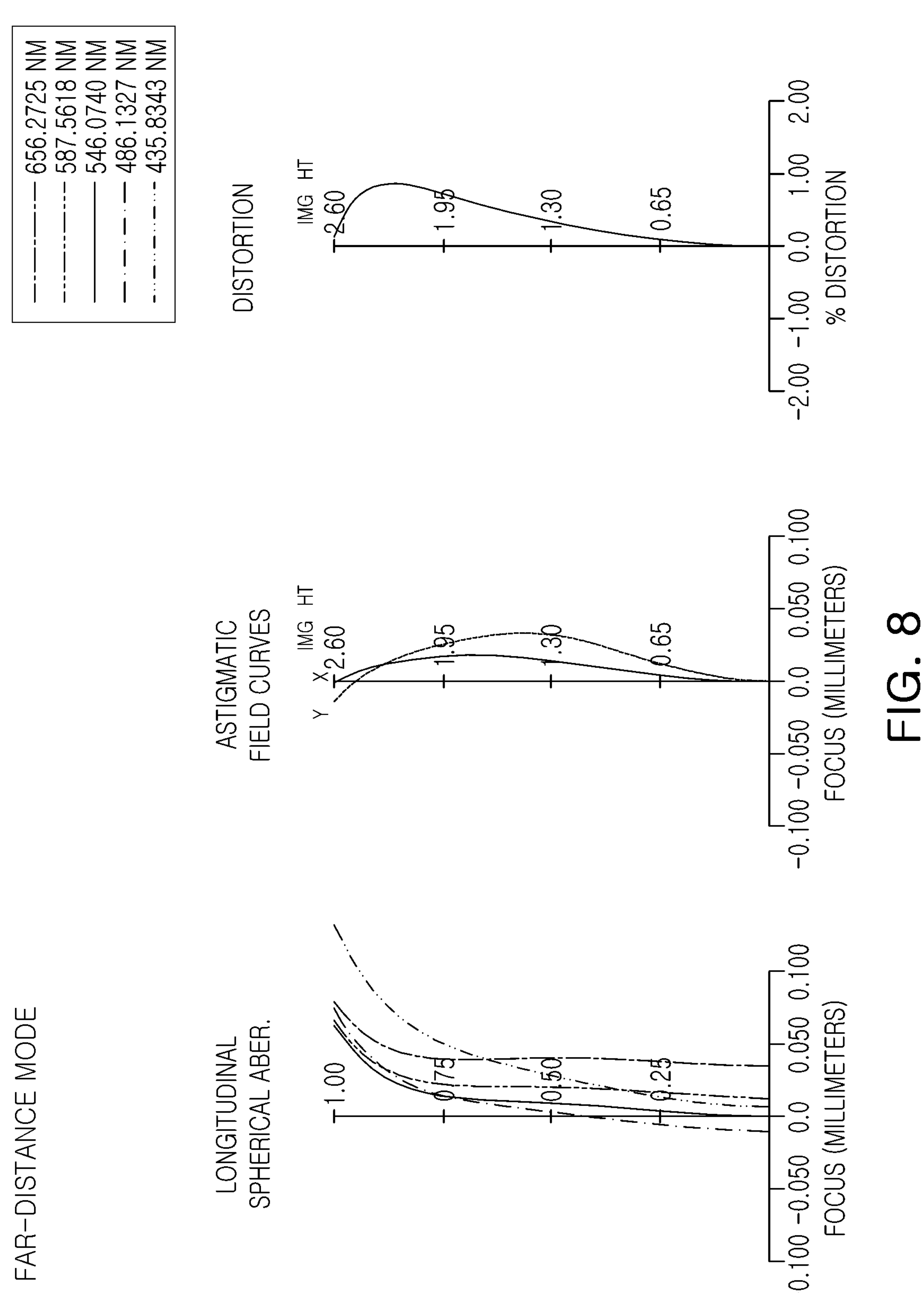
FIG. 8 shows aberration curves of the far-distance mode of the imaging lens system according to the second example illustrated in FIG. 6.
Figure 9:
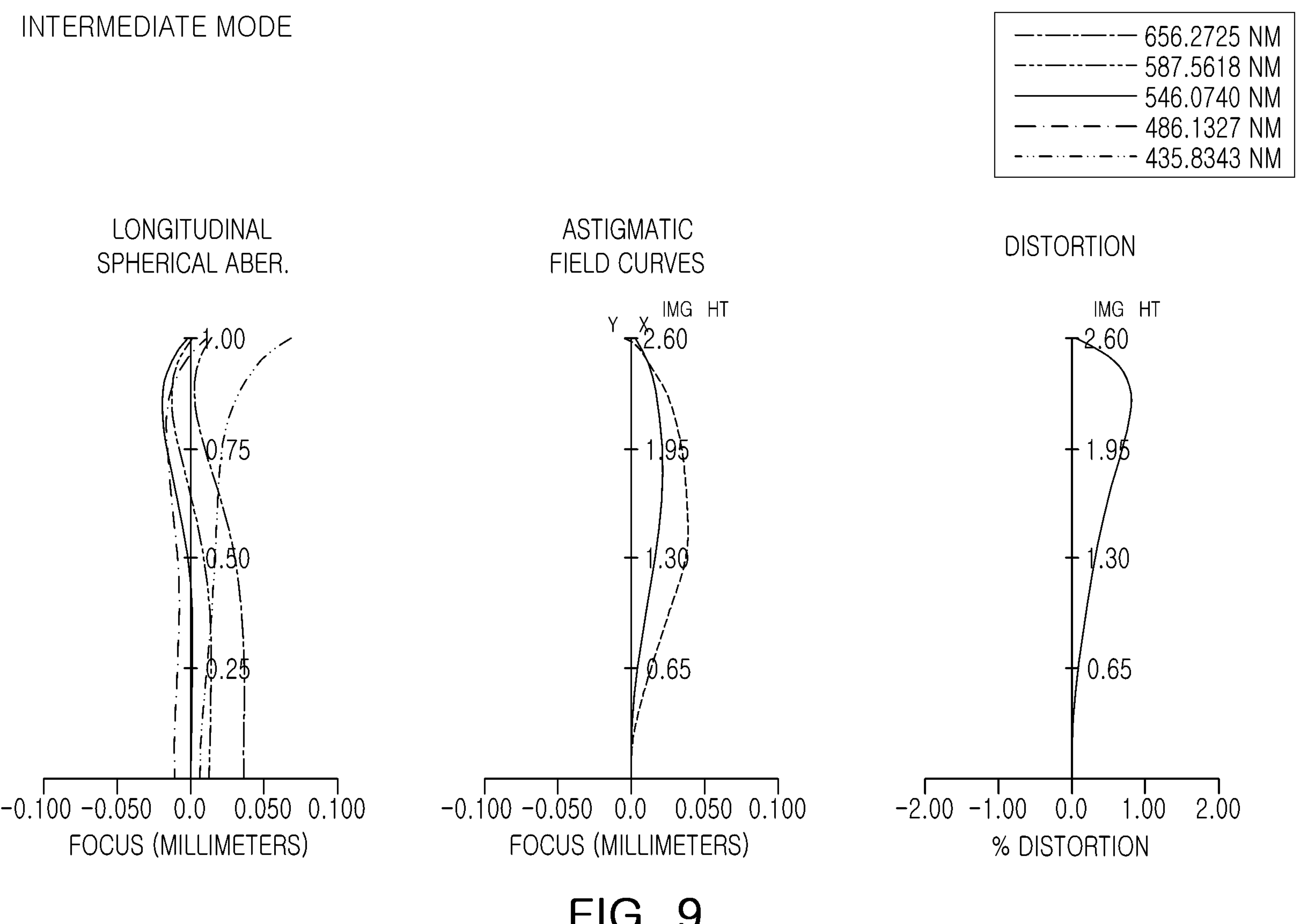
FIG. 9 shows aberration curves of an intermediate mode of the imaging lens system according to the second example.
Figure 10:
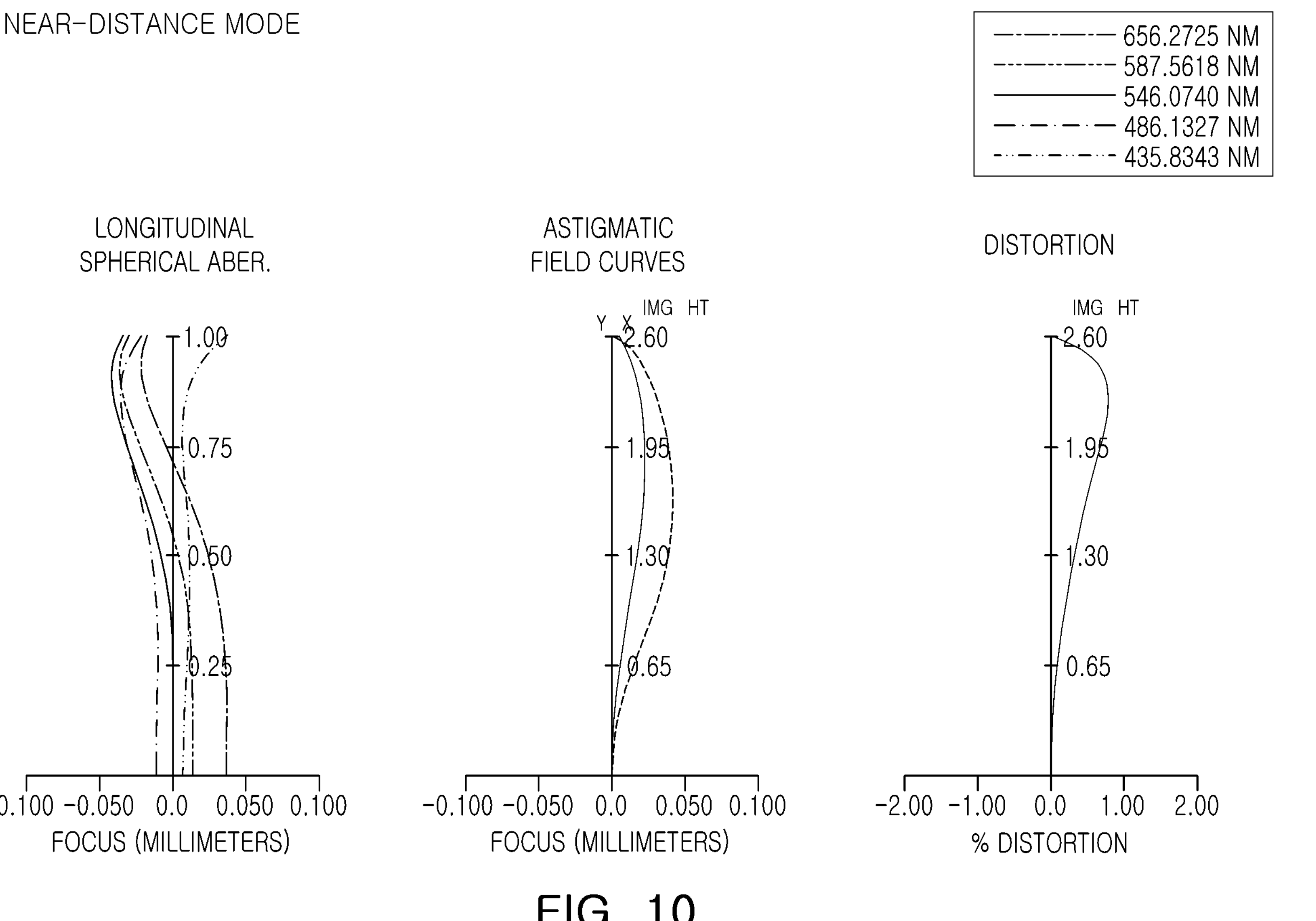
FIG. 10 shows aberration curves of the near-distance mode of the imaging lens system according to the second example illustrated in FIG. 7.

FIG. 8 shows aberration curves of the far-distance mode of the imaging lens system 200 illustrated in FIG. 6. FIG. 9 shows aberration curves of the intermediate mode of the imaging lens system 200. FIG. 10 shows aberration curves of the near-distance mode of the imaging lens system 200 illustrated in FIG. 7.

Figure 11:
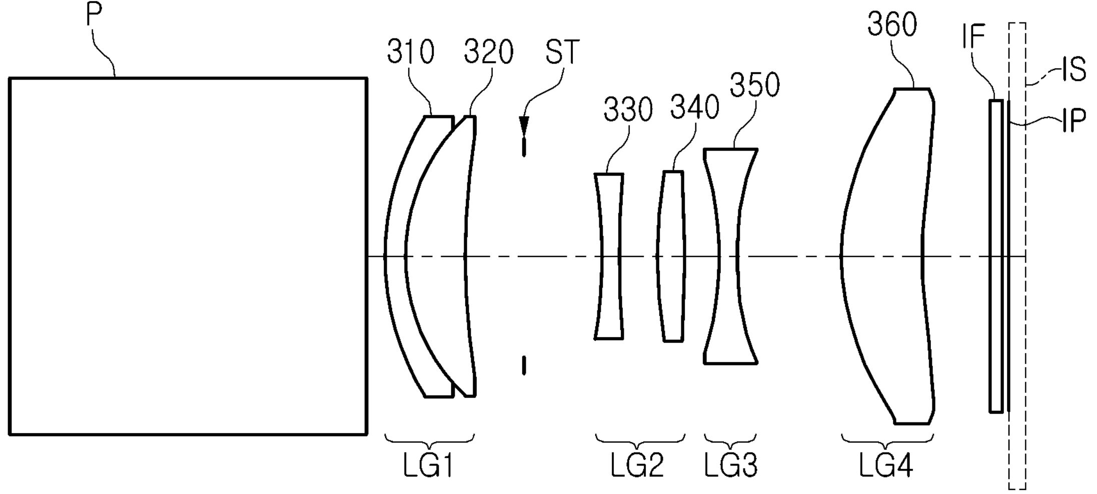
FIG. 11 is a configuration diagram of far-distance mode of an imaging lens system according to a third example.
Figure 12:
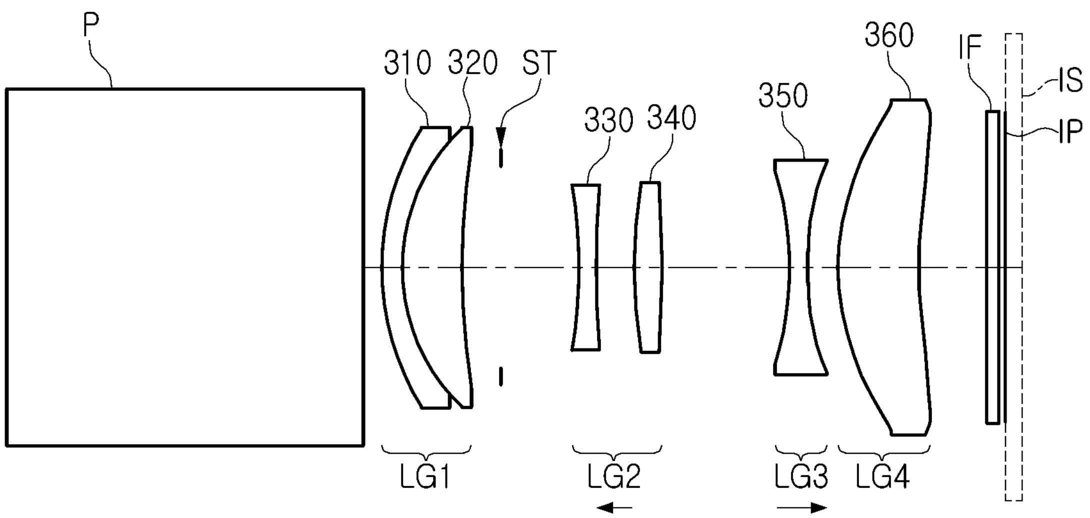
FIG. 12 is a configuration diagram of a near-distance mode of the imaging lens system according to the third example.

FIG. 11 is a configuration diagram of a far-distance mode of an imaging lens system according to a third example, and FIG. 12 is a configuration diagram of a near-distance mode of the imaging lens system according to the third example.

An imaging lens system 300 according to the third example may include a plurality of lens groups. For example, the imaging lens system 300 may include a first lens group LG1, a second lens group LG2, a third lens group LG3, and a fourth lens group LG4. The first lens group LG1 to the fourth lens group LG4 may be sequentially disposed in ascending numerical order along an optical axis of the imaging lens system 300 from an object side of the imaging lens system 300 toward an image plane of the imaging lens system 300. For example, the second lens group LG2 is disposed on the image side of the first lens group LG1, the third lens group LG3 is disposed on the image side of the second lens group LG2, and the fourth lens group LG4 is disposed on the image side of the third lens group LG3. Each of the first lens group LG1 to the fourth lens group LG4 may include one or more lenses. As an example, each of the first lens group LG1 and the second lens group LG2 includes two lenses, and each of the third lens group LG3 and the fourth lens group LG4 includes one lens.

The first lens group LG1 includes a first lens 310 and a second lens 320. The first lens 310 has a negative refractive power, and has a convex object-side surface and a concave image-side surface. The second lens 320 has a positive refractive power, and has a convex object-side surface and a concave image-side surface. The second lens group LG2 includes a third lens 330 and a fourth lens 340. The third lens 330 has a negative refractive power, and has a concave object-side surface and a concave image-side surface. The fourth lens 340 has a positive refractive power, and has a convex object-side surface and a convex image-side surface. The third lens group LG3 includes a fifth lens 350. The fifth lens 350 has a negative refractive power, and has a concave object-side surface and a concave image-side surface. The fourth lens group LG4 includes a sixth lens 360. The sixth lens 360 has a positive refractive power, and has a convex object-side surface and a concave image-side surface.

One or more of the first lens group LG1 to the fourth lens group LG4 may be configured to be movable in the optical axis direction. For example, in the third example, the second lens group LG2 and the third lens group LG3 may be configured to be movable in the optical axis direction. Therefore, the imaging lens system 300 according to the third example may enable autofocusing (AF) and focus magnification adjustment (zoom) of the camera module through the movements of the second lens group LG2 and the third lens group LG3.

The imaging lens system 300 may further include other optical elements in addition to the first lens 310 to the sixth lens 360. For example, the imaging lens system 300 may further include an optical path changing element P, a stop ST, a filter IF or a cover glass, and an image plane IP. For example, the optical path changing element P may be a prism or a mirror. The optical path changing element P may be configured to reflect or refract light incident from a direction intersecting the optical axis of the first lens 310 to the sixth lens 360, in the optical axis direction of the first lens 310 to the sixth lens 360. The stop ST may be disposed between the second lens 320 and the third lens 330, and the filter IF may be disposed between the sixth lens 360 and the image plane IP. For reference, it may be possible to omit the filter IF and dispose a cover glass in its place. The image plane IP may be disposed at a position where light incident through the first lens 310 to the sixth lens 360 is focused. For example, the image plane IP may be disposed on one surface of an image sensor IS of the camera module or on an optical element disposed inside the image sensor IS.

The imaging lens system 300 according to the third example may implement two or more imaging modes. As an example, the imaging lens system 300 may implement a first imaging mode (or a far-distance mode) using the configuration illustrated in FIG. 11. As another example, the imaging lens system 300 may implement a second imaging mode (or a near-distance mode) using the configuration illustrated in FIG. 12. The change from the first imaging mode to the second imaging mode and the change from the second imaging mode to the first imaging mode may be performed by changing positions of the second lens group LG2 and the third lens group LG3.

For example, the imaging lens system 300 according to the second imaging mode may be implemented by moving the second lens group LG2 toward the object side and the third lens group LG3 toward the image side in the imaging lens system 300 according to the first imaging mode. As another example, the imaging lens system 300 according to the first imaging mode may be implemented by moving the second lens group LG2 toward the image side and the third lens group LG3 toward the object side in the imaging lens system 300 according to the second imaging mode.

The imaging lens system 300 may also implement a third imaging mode (or an intermediate mode) in which the position of the second lens group LG2 is between the position of the second lens group LG2 in the first imaging mode (or the far-distance mode) and the position of the second lens group LG2 in the second imaging mode (or the near-distance mode), and the position of the third lens group LG3 is between the position of the third lens group LG3 in the first imaging mode (or the far-distance mode) and the position of the third lens group LG3 in the second imaging mode (or the near-distance mode).

Tables 5 and 6 below show the lens characteristics of the imaging lens system and the distance between the lens groups according to the third example.

TABLE 5

| Surface Number | Element | Radius of Curvature | Thickness/ Distance | Refractive Index | Abbe Number |
|---|---|---|---|---|---|
| S0 | Object | Infinity | D0 | | |
| S1 | Prism | Infinity | 6.0000 | 1.517 | 64.20 |
| S2 | | Infinity | 0.3100 | | |
| S3 | First Lens | 4.3880 | 0.3400 | 1.946 | 17.98 |
| S4 | Second | 3.2480 | 1.0100 | 1.883 | 40.80 |
| S5 | Lens | 13.3970 | D1 | | |
| S6 | Stop | Infinity | 1.3020 | | |
| S7 | Third | −8.2090 | 0.3000 | 1.635 | 23.96 |

TABLE 5-continued

| Surface Number | Element | Radius of Curvature | Thickness/ Distance | Refractive Index | Abbe Number |
|---|---|---|---|---|---|
| S8 | Lens | 32.4710 | 0.6273 | | |
| S9 | Fourth | 7.0440 | 0.4700 | 1.535 | 55.71 |
| S10 | Lens | −24.8860 | D2 | | |
| S11 | Fifth | −4.3970 | 0.3000 | 1.535 | 55.71 |
| S12 | Lens | 6.7790 | D3 | | |
| S13 | Sixth | 3.2090 | 1.3500 | 1.635 | 23.96 |
| S14 | Lens | 4.3740 | 1.1477 | | |
| S15 | Filter | Infinity | 0.2100 | 1.517 | 64.21 |
| S16 | | Infinity | 0.1000 | | |
| S17 | Image Plane | Infinity | 0.0000 | | |

TABLE 6

| Mode | m | D0 | D1 | D2 | D3 |
|---|---|---|---|---|---|
| Far-Distance Mode | 0 | Infinity | 1.000000 | 0.567393 | 1.757954 |
| Intermediate Mode | −0.082 | 130.7254 | 0.822722 | 1.362374 | 1.141539 |
| Near-Distance Mode | −0.15 | 68.0300 | 0.657859 | 2.146737 | 0.522043 |

Figure 13:
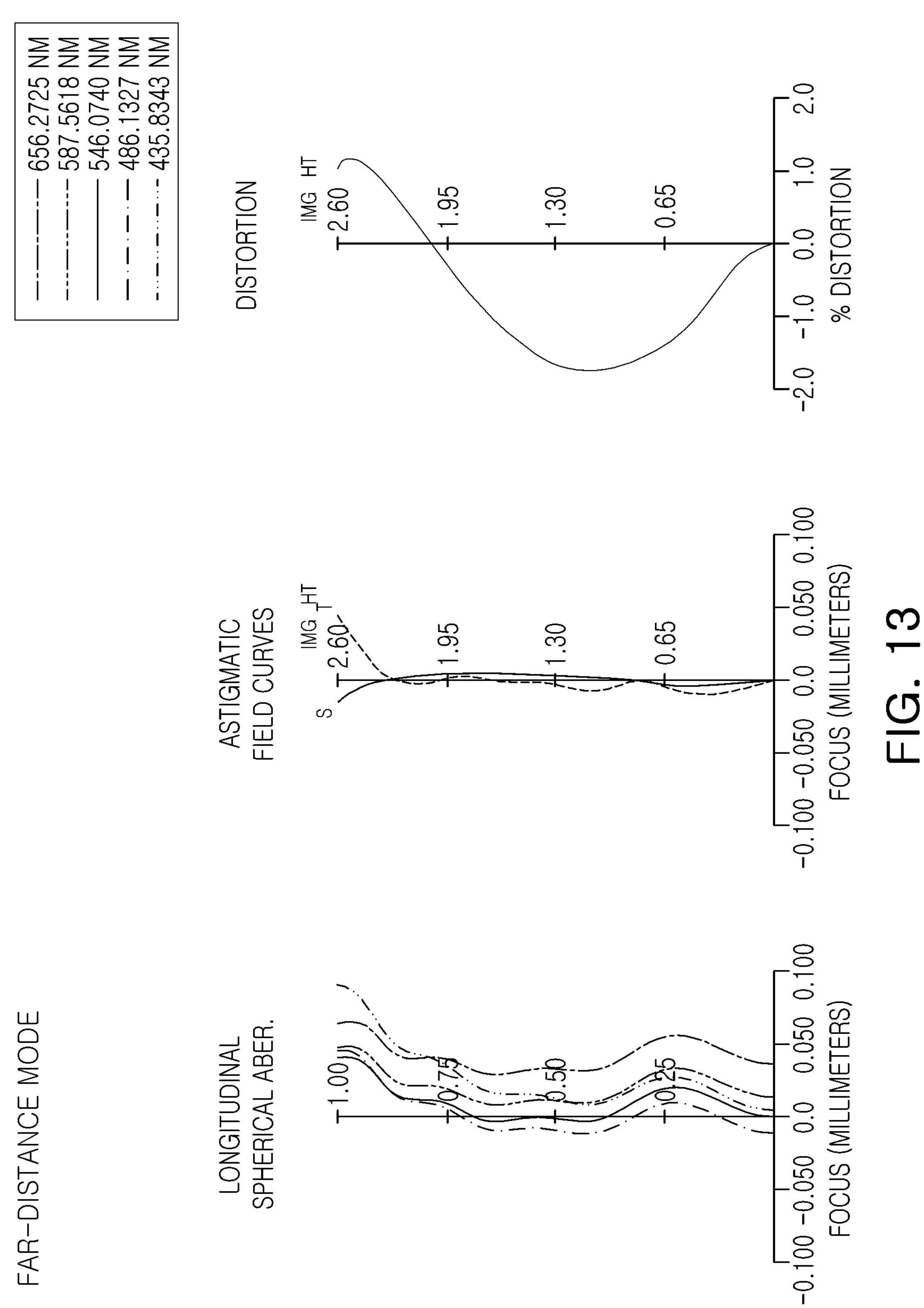
FIG. 13 shows aberration curves of the far-distance mode of the imaging lens system according to the third example illustrated in FIG. 11.
Figure 14:
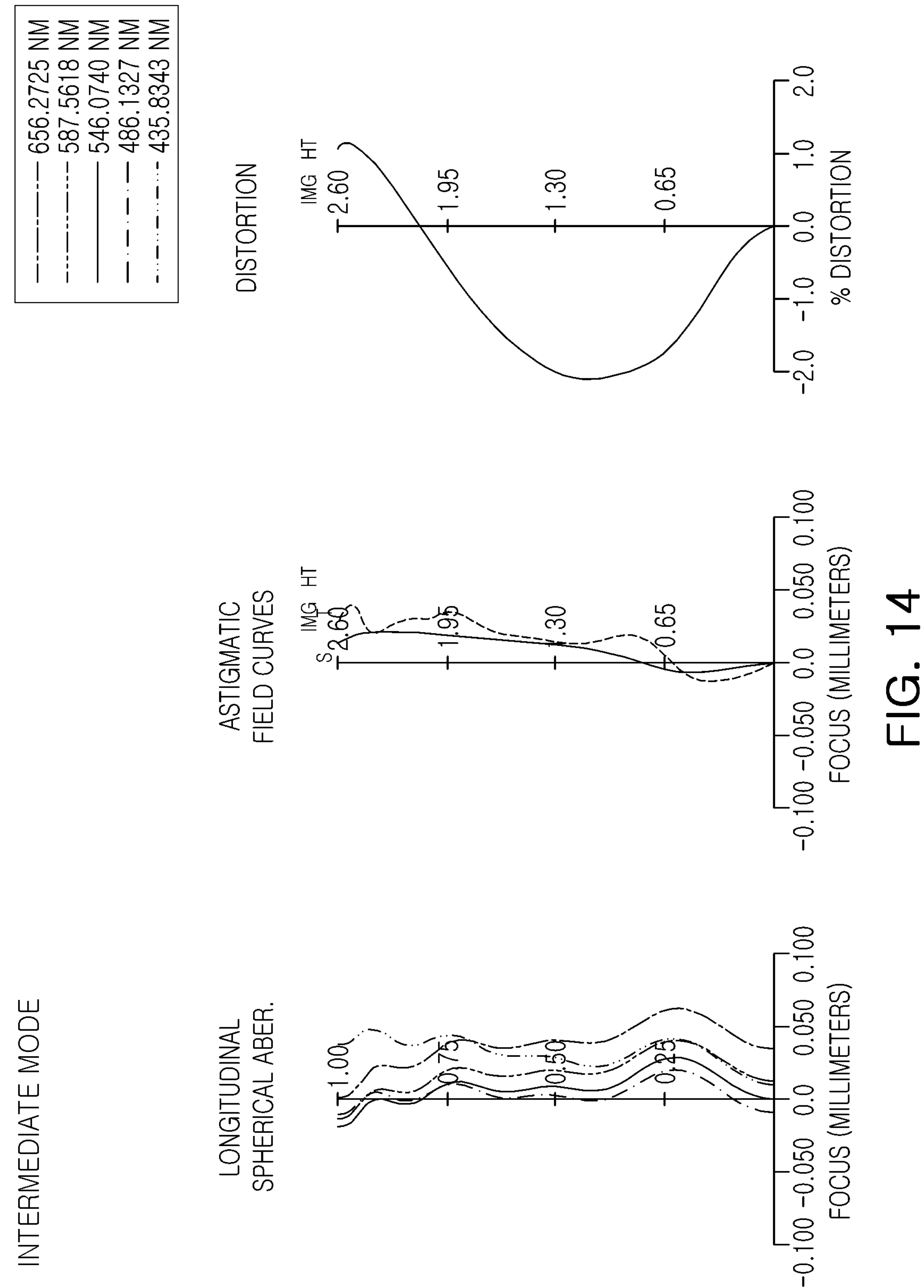
FIG. 14 shows aberration curves of an intermediate mode of the imaging lens system according to the third example.
Figure 15:
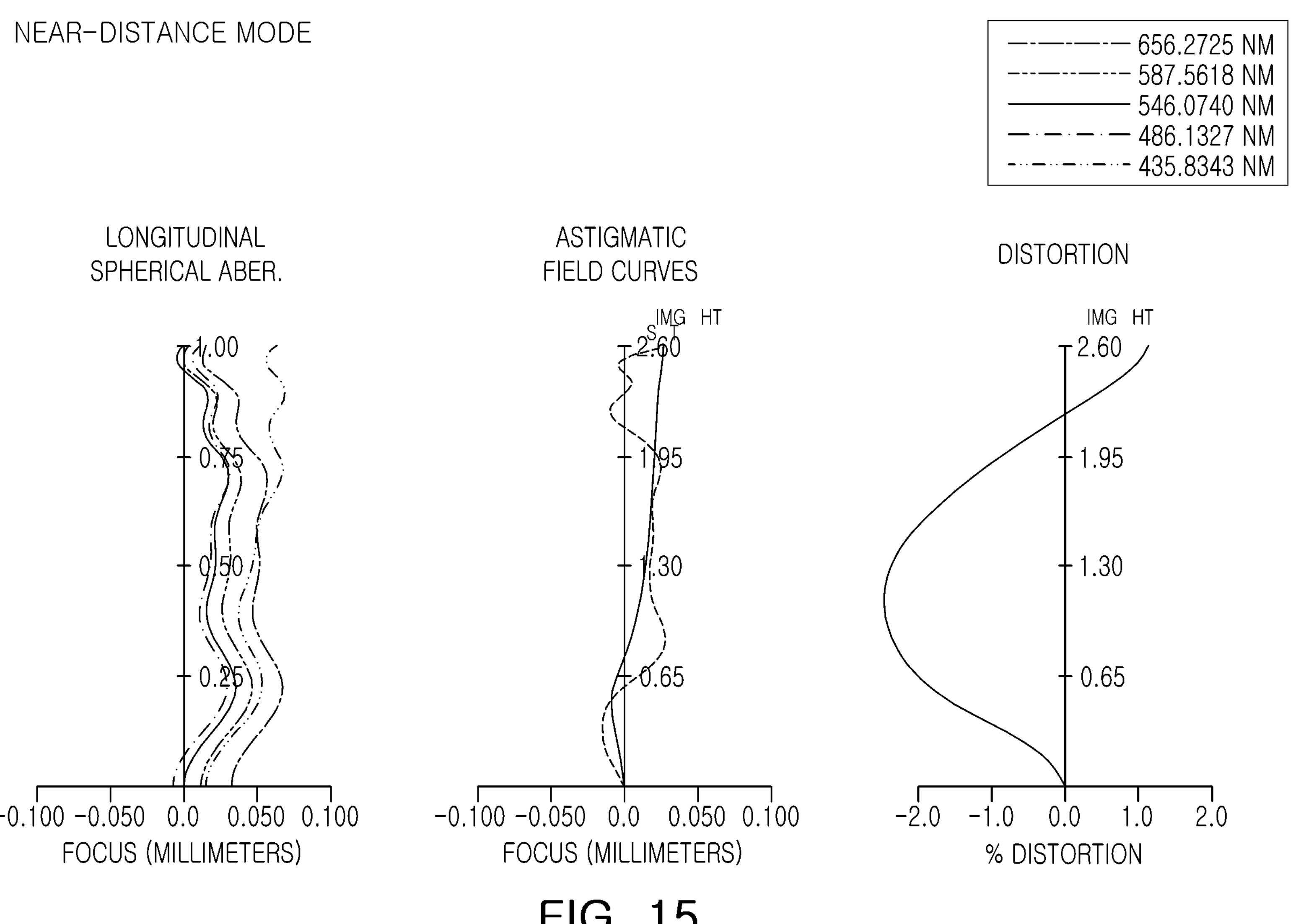
FIG. 15 shows aberration curves of the near-distance mode of the imaging lens system according to the third example illustrated in FIG. 12.

FIG. 13 shows aberration curves of the far-distance mode of the imaging lens system 300 illustrated in FIG. 11. FIG. 14 shows aberration curves of the intermediate mode of the imaging lens system 300. FIG. 15 shows aberration curves of the near-distance mode of the imaging lens system 300 illustrated in FIG. 12.

Figure 16:
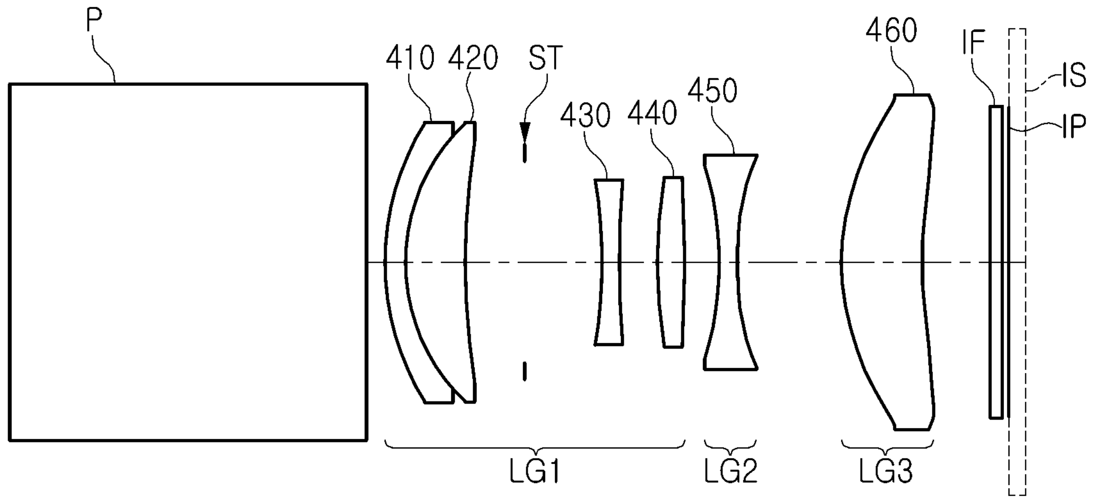
FIG. 16 is a configuration diagram of a far-distance mode of an imaging lens system according to a fourth example.
Figure 17:
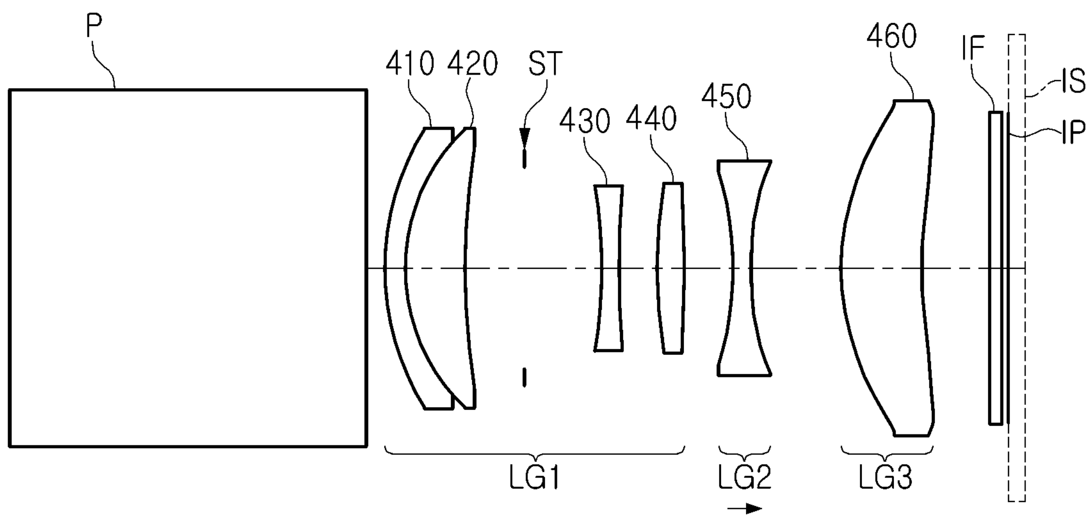
FIG. 17 is a configuration diagram of a near-distance mode of the imaging lens system according to the fourth example.

FIG. 16 is a configuration diagram of a far-distance mode of an imaging lens system according to a fourth example, and FIG. 17 is a configuration diagram of a near-distance mode of the imaging lens system according to the fourth example.

An imaging lens system 400 according to the fourth example may include a plurality of lens groups. For example, the imaging lens system 400 may include a first lens group LG1, a second lens group LG2, and a third lens group LG3. The first lens group LG1 to the third lens group LG3 may be sequentially disposed in ascending numerical order from an object side of the imaging lens system 400 toward an image plane of the imaging lens system 400. For example, the second lens group LG2 is disposed on the image side of the first lens group LG1, and the third lens group LG3 is disposed on the image side of the second lens group LG2. Each of the first lens group LG1 to the third lens group LG3 may include one or more lenses. As an example, the first lens group LG1 includes four lenses, and each of the second lens group LG2 and the third lens group LG3 includes one lens.

The first lens group LG1 includes a first lens 410, a second lens 420, a third lens 430, and a fourth lens 440. The first lens 410 has a negative refractive power, and has a convex object-side surface and a concave image-side surface. The second lens 420 has a positive refractive power, and has a convex object-side surface and a concave image-side surface. The third lens 430 has a negative refractive power, and has a concave object-side surface and a concave image-side surface. The fourth lens 440 has a positive refractive power, and has a convex object-side surface and a convex image-side surface. The second lens group LG2 includes a fifth lens 450. The fifth lens 450 has a negative refractive power, and has a concave object-side surface and a concave image-side surface. The third lens group LG3 includes a sixth lens 460. The sixth lens 460 has a positive refractive power, and has a convex object-side surface and a concave image-side surface.

The second lens group LG2 may be configured to be movable in the optical axis direction. Therefore, the imaging lens system 400 according to the fourth example may enable autofocusing (AF) and focus magnification adjustment (Zoom) of the camera module through the movement of the second lens group LG2.

The imaging lens system 400 may further include other optical elements in addition to the first lens 410 to the sixth lens 460. For example, the imaging lens system 400 may further include an optical path changing element P, a stop ST, a filter IF or a cover glass, and an image plane IP. For example, the optical path changing element P may be a prism or a mirror. The optical path changing element P may be configured to reflect or refract light incident from a direction intersecting the optical axis of the first lens 410 to the sixth lens 460, in the optical axis direction of the first lens 410 to the sixth lens 460. The stop ST may be disposed between the second lens 420 and the third lens 430, and the filter IF may be disposed between the sixth lens 460 and the image plane IP. The image plane IP may be disposed at a position where light incident through the first lens 410 to the sixth lens 460 is focused. For example, the image plane IP may be disposed on one surface of an image sensor IS of the camera module or on an optical element disposed inside the image sensor IS.

The imaging lens system 400 according to the fourth example may implement two or more imaging modes. As an example, the imaging lens system 400 may implement a first imaging mode (or a far-distance mode) using the configuration illustrated in FIG. 16. As another example, the imaging lens system 400 may implement a second imaging mode (or a near-distance mode) using the configuration illustrated in FIG. 17. The change from the first imaging mode to the second imaging mode and the change from the second imaging mode to the first imaging mode may be performed by changing the position of the second lens group LG2.

For example, the imaging lens system 400 according to the second imaging mode may be implemented by moving the second lens group LG2 toward the image side in the imaging lens system 400 according to the first imaging mode. As another example, the imaging lens system 400 according to the first imaging mode may be implemented by moving the second lens group LG2 toward the object side in the imaging lens system 400 according to the second imaging mode.

The imaging lens system 400 may also implement a third imaging mode (or an intermediate mode) in which the position of the second lens group LG2 is between the position of the second lens group LG2 in the first imaging mode (or the far-distance mode) and the position of the second lens group LG2 in the second imaging mode (or the near-distance mode).

Tables 7 and 8 below show the lens characteristics of the imaging lens system according to the fourth example and the distance between the lens groups.

TABLE 7

| Surface Number | Element | Radius of Curvature | Thickness/ Distance | Refractive Index | Abbe Number |
|---|---|---|---|---|---|
| S0 | Object | Infinity | D0 | | |
| S1 | Prism | Infinity | 6.0000 | 1.517 | 64.20 |
| S2 | | Infinity | 0.3100 | | |

TABLE 7-continued

| Surface Number | Element | Radius of Curvature | Thickness/ Distance | Refractive Index | Abbe Number |
|---|---|---|---|---|---|
| S3 | First Lens | 4.3880 | 0.3400 | 1.946 | 17.98 |
| S4 | Second | 3.2480 | 1.0100 | 1.883 | 40.80 |
| S5 | Lens | 13.3970 | 1.0000 | | |
| S6 | Stop | Infinity | 1.3020 | | |
| S7 | Third | −8.2090 | 0.3000 | 1.635 | 23.96 |
| S8 | Lens | 32.4710 | 0.6273 | | |
| S9 | Fourth | 7.0440 | 0.4700 | 1.535 | 55.71 |
| S10 | Lens | −24.8860 | D1 | | |
| S11 | Fifth | −4.3970 | 0.3000 | 1.535 | 55.71 |
| S12 | Lens | 6.7790 | D2 | | |
| S13 | Sixth | 3.2090 | 1.3500 | 1.635 | 23.96 |
| S14 | Lens | 4.3740 | 1.1477 | | |
| S15 | Filter | Infinity | 0.2100 | 1.517 | 64.21 |
| S16 | | Infinity | 0.1000 | | |
| S17 | Image Plane | Infinity | 0.0000 | | |

TABLE 8

| Mode | m | D0 | D1 | D2 |
|---|---|---|---|---|
| Far-Distance Mode | 0 | Infinity | 0.567393 | 1.757954 |
| Intermediate Mode | −0.0185 | 600.0000 | 0.692045 | 1.633302 |
| Near-Distance Mode | −0.0367 | 300.0000 | 0.818917 | 1.506430 |

Figure 18:
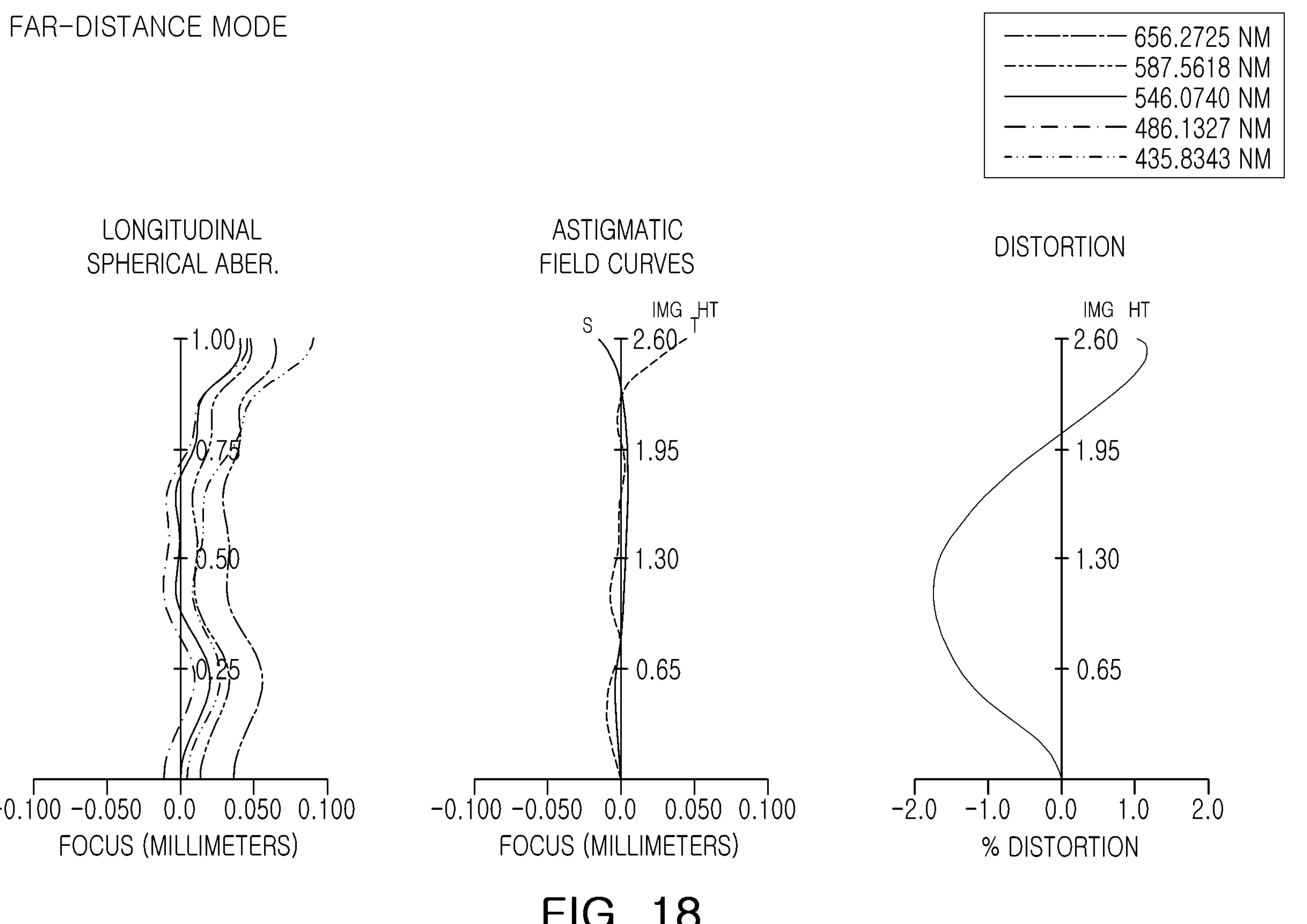
FIG. 18 shows aberration curves of the far-distance mode of the imaging lens system according to the fourth example illustrated in FIG. 16.
Figure 19:
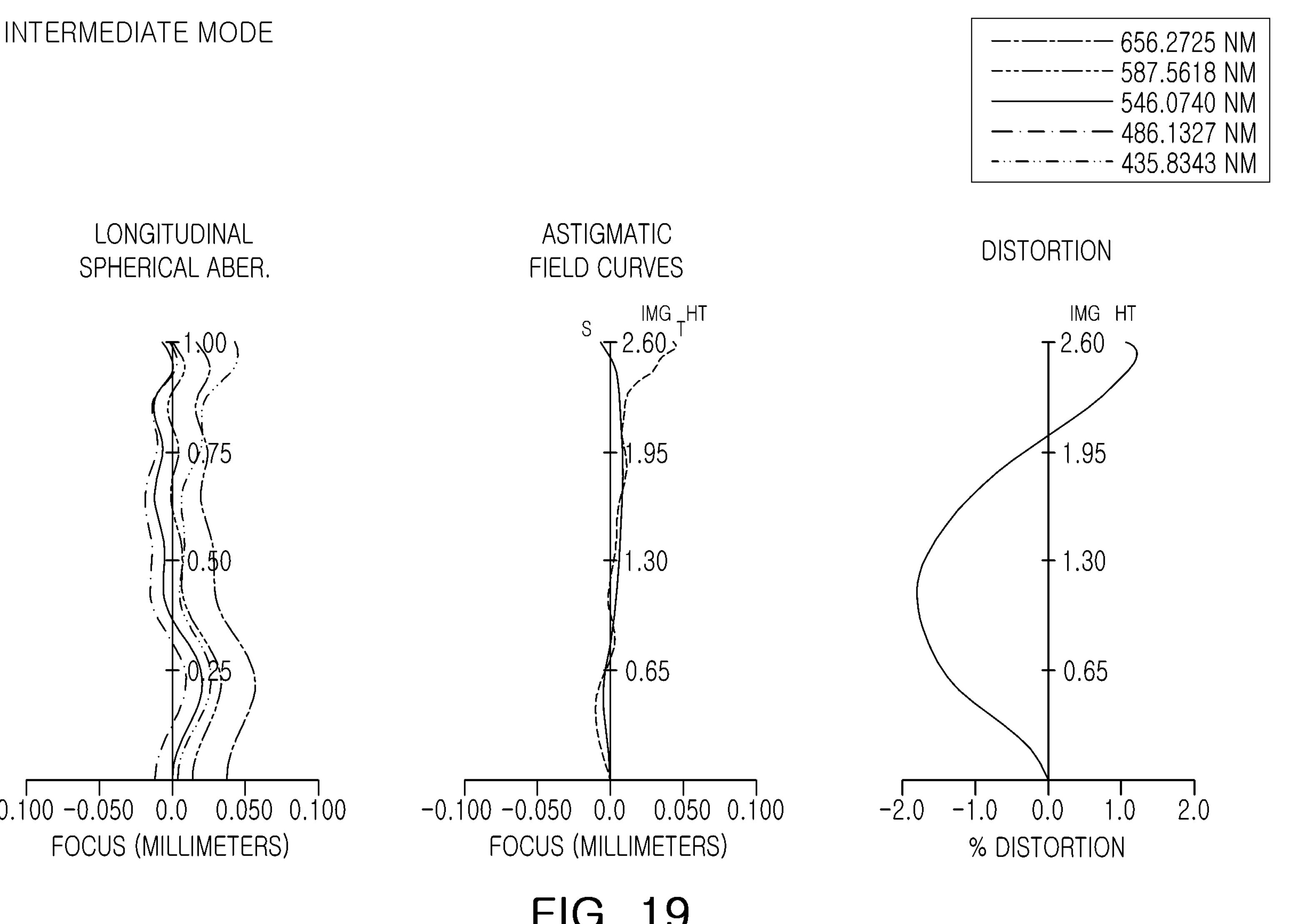
FIG. 19 shows aberration curves of an intermediate mode of the imaging lens system according to the fourth example.
Figure 20:
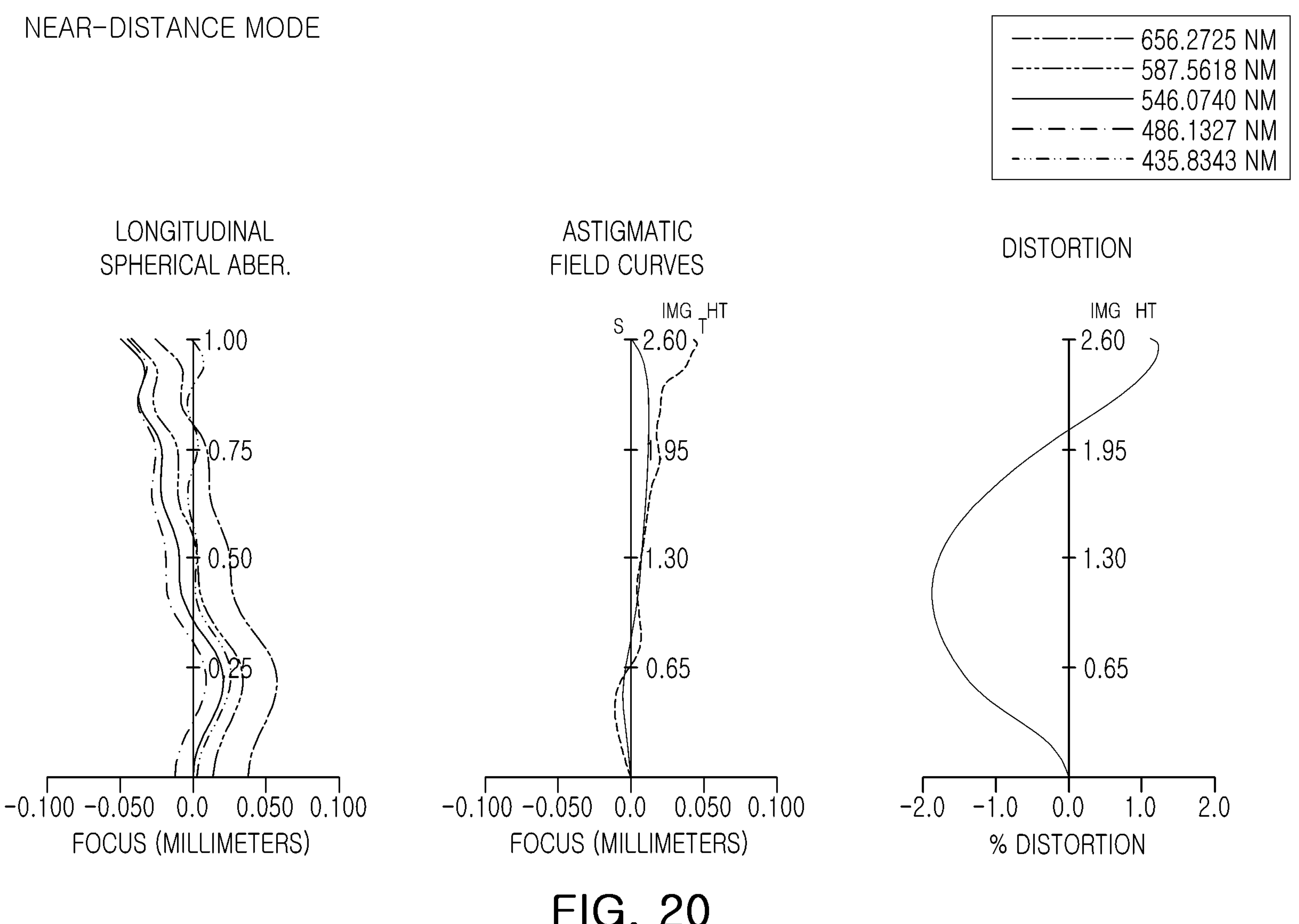
FIG. 20 shows aberration curves of the near-distance mode of the imaging lens system according to the fourth example illustrated in FIG. 17.

FIG. 18 shows aberration curves of the far-distance mode of the imaging lens system 400 illustrated in FIG. 16. FIG. 19 shows aberration curves of the intermediate mode of the imaging lens system 400. FIG. 20 shows aberration curves of the near-distance mode of the imaging lens system 400 illustrated in FIG. 17.

Table 9 below lists values of various quantities of the imaging lens systems according to the first to fourth examples.

TABLE 9

| Quantity | First Example | Second Example | Third Example | Fourth Example |
|---|---|---|---|---|
| fF | 11.2000 | 11.2000 | 11.1860 | 11.1860 |
| fM | 9.7168 | 11.0483 | 9.7057 | 10.8620 |
| fN | 8.4500 | 10.9734 | 8.4507 | 10.5431 |
| f1 | −12.4099 | −12.4099 | −15.4574 | −15.4574 |
| f2 | 4.1747 | 4.1747 | 4.6391 | 4.6391 |
| f3 | −5.0028 | −5.0028 | −10.2904 | −10.2904 |
| f4 | 5.1176 | 5.1176 | 10.3140 | 10.3140 |
| f5 | −5.2470 | −5.2470 | −4.9386 | −4.9386 |
| f6 | 13.7258 | 13.7258 | 13.0862 | 13.0862 |
| TTL | 10.5117 | 10.7947 | 10.4823 | 10.4823 |
| f-number | 2.5400 | 2.5400 | 2.5100 | 2.5100 |
| Y | 2.6000 | 2.6000 | 2.6000 | 2.6000 |
| fG1 | 7.6419 | 7.4019 | 7.1195 | 7.5147 |
| dmax | 1.3366 | 0.1378 | 1.2359 | 0.2515 |
| Mf | −0.1499 | −0.0282 | −0.1500 | −0.0367 |
| SR | 1.375 | 1.375 | 1.680 | 1.680 |
| D0 | 66.3 | 400.0 | 68.0 | 300.0 |

In the above Table 9, fM is the focal length in the intermediate mode of the imaging lens system, and fN is the focal length in the near-distance mode of the imaging lens system.

Table 10 below lists values of Conditional Expressions 1 to 7 and 9 to 22 of the imaging lens systems according to the first to fourth examples.

TABLE 10

| Number | Conditional Expression | First Example | Second Example | Third Example | Fourth Example |
|---|---|---|---|---|---|
| 1 | fG1/Y | 2.6706 | 2.8469 | 2.7383 | 2.8903 |
| 2 | \|dmax/(Y*Mf)\| | 3.4295 | 1.8788 | 3.1690 | 2.6360 |
| 3 | (R12 + R11)/(R12 − R11) | 3.8342 | 3.8342 | 6.5090 | 6.5090 |
| 4 | (R6 + R5)/(R6 − R5) | −0.0837 | −0.0837 | 0.5964 | 0.5964 |
| 5 | SR/Y | 0.5288 | 0.5288 | 0.6462 | 0.6462 |
| 6 | f6/fF | 1.2255 | 1.2255 | 1.1699 | 1.1699 |
| 7 | (D0*Mf)/Y | −3.8210 | −4.3385 | −3.9248 | −4.2346 |
| 9 | TTL/BFL | 6.9110 | 7.0971 | 7.1911 | 7.1911 |
| 10 | D16/TTL | 0.8553 | 0.8591 | 0.8609 | 0.8609 |
| 11 | D16/fF | 0.8027 | 0.8280 | 0.8068 | 0.8068 |
| 12 | TTL/fF | 0.9385 | 0.9638 | 0.9371 | 0.9371 |
| 13 | \|f1/f6\| | 0.9041 | 0.9041 | 1.1812 | 1.1812 |
| 14 | f2/f5 | −0.7956 | −0.7956 | −0.9393 | −0.9393 |
| 15 | f3/f4 | −0.9776 | −0.9776 | −0.9977 | −0.9977 |
| 16 | f2/f5 − f3/f4 | 0.1819 | 0.1819 | 0.0584 | 0.0584 |
| 17 | (f2 − f3)/(f4 − f5) | 0.8855 | 0.8855 | 0.9788 | 0.9788 |
| 18 | (f1 + f2 + f3)/(f4 + f5 + f6) | −0.9736 | −0.9736 | −1.1434 | −1.1434 |
| 19 | \|f1/f6 + f2/f5 + f3/f4 | 2.6773 | 2.6773 | 3.1182 | 3.1182 |
| 20 | (R1 + R11)/(R2 + R12) | 0.8051 | 0.8051 | 0.9967 | 0.9967 |
| 21 | (Nd1 + Nd2 + Nd3)/3 | 1.8879 | 1.8879 | 1.8213 | 1.8213 |
| 22 | (Nd1 + Nd5)/(Nd2 + Nd4) | 0.9989 | 0.9989 | 1.0184 | 1.0184 |

The examples described above provide an imaging lens system that may be mounted in a small camera module and may adjust a focus magnification.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:

a first lens having a negative refractive power;

a second lens having a refractive power;

a third lens having a refractive power;

a fourth lens having a refractive power;

a fifth lens having a refractive power; and a sixth lens having a refractive power, a convex object-side surface in a paraxial region thereof, and a concave image-side surface in a paraxial region thereof, wherein the first to sixth lenses are sequentially disposed in ascending numerical order along an optical axis of the imaging lens system from an object side of the imaging lens system toward an image plane of the imaging lens system, the imaging lens system has a total number of six lenses having a refractive power, one or more of the first to fifth lenses is configured to be movable in an optical axis direction of the imaging lens system, f-number<2.60, where f-number is an f-number of the imaging lens system, $3.0<(R12+R11)/(R12-R11)<7.0$ is satisfied, where R11 is a radius of curvature of the object-side surface of the sixth lens at the optical axis, and R12 is a radius of curvature of the image-side surface of the sixth lens at the optical axis, the one or more of the first to fifth lenses is configured to be movable in the optical axis direction to vary a focal length of the imaging lens system, and $1.0<f6/fF<1.3$ is satisfied, where fF is a maximum focal length of the imaging lens system, and f6 is a focal length of the sixth lens.

2. The imaging lens system of claim 1, further comprising an optical path changing element disposed on an object side of the first lens.

3. The imaging lens system of claim 1, wherein the second lens has a positive refractive power.

4. The imaging lens system of claim 1, wherein the sixth lens has a positive refractive power.

5. The imaging lens system of claim 1, wherein the third lens has a concave object-side surface in a paraxial region thereof.

6. The imaging lens system of claim 1, wherein the third lens has a concave image-side surface in a paraxial region thereof.

7. The imaging lens system of claim 1, wherein the fifth lens has a concave object-side surface in a paraxial region thereof.

8. The imaging lens system of claim 1, wherein the fifth lens has a concave image-side surface in a paraxial region thereof.

9. The imaging lens system of claim 1, wherein $-0.2<(R6+R5)/(R6-R5)<0.8$ is satisfied, where R5 is a radius of curvature of an object-side surface of the third lens at the optical axis, and R6 is a radius of curvature of an image-side surface of the third lens at the optical axis.

10. The imaging lens system of claim 1, wherein the first and second lenses constitute a first lens group, the third and fourth lenses constitute a second lens group, the fifth lens constitutes a third lens group, the sixth lens constitutes a fourth lens group, the first lens group is disposed at a fixed position, the fourth lens group is disposed at a fixed position, the second lens group is configured to be movable toward the image plane in the optical axis direction and the third lens group is configured to be movable toward the object side of the imaging lens system in the optical axis direction to increase a focal length of the imaging lens system, and the second lens group is further configured to be movable toward the object side of the imaging lens system in the optical axis direction and the third lens group is further configured to be movable toward the image plane in the optical axis direction to decrease the focal length of the imaging lens system.

11. The imaging lens system of claim 1, wherein the first to fourth lenses constitute a first lens group, the fifth and sixth lenses constitute a second lens group, the second lens group is disposed at a fixed position, the first lens group is configured to be movable toward the image plane in the optical axis direction to increase a focal length of the imaging lens system, and the first lens group is further configured to be movable toward the object side of the imaging lens system in the optical axis direction to decrease the focal length of the imaging lens system.

12. The imaging lens system of claim 1, wherein the first to fourth lenses constitute a first lens group, the fifth lens constitutes a second lens group, the sixth lens constitutes a third lens group, the first lens group is disposed at a fixed position, the third lens group is disposed at a fixed position, the second lens group is configured to be movable toward the object side of the imaging lens system in the optical axis direction to increase a focal length of the imaging lens system, and the second lens group is further configured to be movable toward the image plane in the optical axis direction to decrease the focal length of the imaging lens system.

* * * * *